United States Patent
Ryu et al.

(10) Patent No.: US 7,322,490 B2
(45) Date of Patent: Jan. 29, 2008

(54) LIQUID CRYSTAL DISPENSING SYSTEM AND METHOD OF DISPENSING LIQUID CRYSTAL MATERIAL USING SAME

(75) Inventors: Joung-Ho Ryu, Seoul (KR); Soo-Min Kwak, Gyeongsangbuk-Do (KR); Hae-Joon Son, Busan (KR); Man-Ho An, Gyeongsangbuk-Do (KR); Joon-Young Kim, Gyeongsangbuk-Do (KR); Do-Hyun Ryu, Gyeongsangbuk-Do (KR); Seung-Soo Lee, Daegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/840,415

(22) Filed: May 7, 2004

(65) Prior Publication Data
US 2005/0000982 A1     Jan. 6, 2005

(30) Foreign Application Priority Data
May 9, 2003     (KR) .................... 10-2003-0029456

(51) Int. Cl.
*B67D 5/08*     (2006.01)
(52) U.S. Cl. .......................................... 222/1
(58) Field of Classification Search ................ 222/1; 445/24, 25; 349/190
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii et al. | |
| 5,680,189 A | 10/1997 | Shimizu et al. | |
| 5,742,370 A | 4/1998 | Kim et al. | |
| 5,757,451 A | 5/1998 | Miyazaki et al. | |

(Continued)

FOREIGN PATENT DOCUMENTS

EP     1 003 066     5/2000

(Continued)

*Primary Examiner*—J. Casimer Jacyna
(74) *Attorney, Agent, or Firm*—McKenna, Long & Aldridge LLP

(57) ABSTRACT

A liquid crystal dispensing system includes a container to contain liquid crystal to be dispensed, a discharge pump to receive the liquid crystal from the container and to discharge the liquid crystal, a nozzle to dispense the liquid crystal discharged from the discharge pump onto a substrate, and a control unit to control a dispensing amount of liquid crystal discharged from the discharge pump and to compensate the dispensing amount when the dispensing amount of liquid crystal exceeds a limitation value.

26 Claims, 16 Drawing Sheets

U.S. PATENT DOCUMENTS

| | | | |
|---|---|---|---|
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |
| 5,952,676 A | 9/1999 | Sato et al. |
| 5,956,112 A | 9/1999 | Fujimori et al. |
| 6,001,203 A | 12/1999 | Yamada et al. |
| 6,011,609 A | 1/2000 | Kato et al. |
| 6,016,178 A | 1/2000 | Kataoka et al. |
| 6,016,181 A | 1/2000 | Shimada |
| 6,055,035 A | 4/2000 | von Gutfeld et al. |
| 6,163,357 A | 12/2000 | Nakamura |
| 6,219,126 B1 | 4/2001 | Von Gutfeld |
| 6,226,067 B1 | 5/2001 | Nishiguchi et al. |
| 6,236,445 B1 | 5/2001 | Foschaar et al. |
| 6,304,306 B1 | 10/2001 | Shiomi et al. |
| 6,304,311 B1 | 10/2001 | Egami et al. |
| 6,337,730 B1 | 1/2002 | Ozaki et al. |
| 6,414,733 B1 | 7/2002 | Ishikawa et al. |
| 6,863,097 B2 * | 3/2005 | Ryu et al. ............ 141/95 |
| 2001/0021000 A1 | 9/2001 | Egami |
| 2004/0011422 A1 | 1/2004 | Ryu et al. |

FOREIGN PATENT DOCUMENTS

| | | |
|---|---|---|
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-054228 | 3/1987 |
| JP | 62-054229 | 3/1987 |
| JP | 62-89025 | 4/1987 |
| JP | 62-90622 | 4/1987 |
| JP | 62-054229 | 9/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 05-036426 | 2/1993 |
| JP | 05-107533 | 4/1993 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | 06-018829 | 1/1994 |
| JP | 6-51256 | 2/1994 |
| JP | 06-064229 | 3/1994 |
| JP | 6-148657 | 5/1994 |
| JP | 6-160871 | 6/1994 |
| JP | 06-194637 | 7/1994 |
| JP | 6-235925 | 8/1994 |
| JP | 6-265915 | 9/1994 |
| JP | 6-313870 | 11/1994 |
| JP | 7-84268 | 3/1995 |
| JP | 7-128674 | 5/1995 |
| JP | 7-181507 | 7/1995 |
| JP | 07-275770 | 10/1995 |
| JP | 07-275771 | 10/1995 |
| JP | 08-076133 | 3/1996 |
| JP | 8-95066 | 4/1996 |
| JP | 8-101395 | 4/1996 |
| JP | 8-106101 | 4/1996 |
| JP | 08-110504 | 4/1996 |
| JP | 08-136937 | 5/1996 |
| JP | 8-171094 | 7/1996 |
| JP | 08-173874 | 7/1996 |
| JP | 8-190099 | 7/1996 |
| JP | 8-240807 | 9/1996 |
| JP | 09-001026 | 1/1997 |
| JP | 9-5762 | 1/1997 |
| JP | 9-26578 | 1/1997 |
| JP | 9-61829 | 3/1997 |
| JP | 9-73075 | 3/1997 |
| JP | 9-73096 | 3/1997 |
| JP | 09-094500 | 4/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-174924 | 6/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 05-107533 | 4/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | 11-262712 | 9/1999 |
| JP | 11-264991 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 03-009549 | 1/2001 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |

| | | | | | |
|---|---|---|---|---|---|
| JP | 2001-166310 | 6/2001 | JP | 2002-156518 | 5/2002 |
| JP | 2001-183683 | 7/2001 | JP | 2002-169166 | 6/2002 |
| JP | 2001-201750 | 7/2001 | JP | 2002-169167 | 6/2002 |
| JP | 2001-209052 | 8/2001 | JP | 2002-182222 | 6/2002 |
| JP | 2001-209056 | 8/2001 | JP | 2002-202512 | 7/2002 |
| JP | 2001-209057 | 8/2001 | JP | 2002-202514 | 7/2002 |
| JP | 2001-209060 | 8/2001 | JP | 2002-214626 | 7/2002 |
| JP | 2001-215459 | 8/2001 | JP | 2002-229042 | 8/2002 |
| JP | 2001-222017 | 8/2001 | JP | 2002-236276 | 8/2002 |
| JP | 2001-235758 | 8/2001 | JP | 2002-236292 | 8/2002 |
| JP | 2002-209058 | 8/2001 | JP | 2002-258299 | 9/2002 |
| JP | 2001-255542 | 9/2001 | JP | 2002-277865 | 9/2002 |
| JP | 2001-264782 | 9/2001 | JP | 2002-277866 | 9/2002 |
| JP | 2001-272640 | 10/2001 | JP | 2002-277881 | 9/2002 |
| JP | 2001-281675 | 10/2001 | JP | 2002-287156 | 10/2002 |
| JP | 2001-281678 | 10/2001 | JP | 2002-296605 | 10/2002 |
| JP | 2001-282126 | 10/2001 | JP | 2002-311438 | 10/2002 |
| JP | 2001-305563 | 10/2001 | JP | 2002-311440 | 10/2002 |
| JP | 2001-330837 | 11/2001 | JP | 2002-311442 | 10/2002 |
| JP | 2001-330840 | 11/2001 | JP | 2002-323687 | 11/2002 |
| JP | 2001-356353 | 12/2001 | JP | 2002-323694 | 11/2002 |
| JP | 2001-356354 | 12/2001 | JP | 2002-333628 | 11/2002 |
| JP | 2002-14360 | 1/2002 | JP | 2002-333635 | 11/2002 |
| JP | 2002-23176 | 1/2002 | JP | 2002-333843 | 11/2002 |
| JP | 2002-49045 | 2/2002 | JP | 2002-341329 | 11/2002 |
| JP | 2002-079160 | 3/2002 | JP | 2002-341355 | 11/2002 |
| JP | 2002-82340 | 3/2002 | JP | 2002-341356 | 11/2002 |
| JP | 2002-90759 | 3/2002 | JP | 2002-341357 | 11/2002 |
| JP | 2002-90760 | 3/2002 | JP | 2002-341358 | 11/2002 |
| JP | 2002-107740 | 4/2002 | JP | 2002-341359 | 11/2002 |
| JP | 2002-122870 | 4/2002 | JP | 2002-341362 | 11/2002 |
| JP | 2002-122872 | 4/2002 | KR | 2000-0035302 | 6/2000 |
| JP | 2002-122873 | 4/2002 | | | |
| JP | 2002-131762 | 5/2002 | | | |
| JP | 2002-139734 | 5/2002 | | | |

* cited by examiner

LIQUID CRYSTAL DISPENSING SYSTEM AND METHOD OF DISPENSING LIQUID CRYSTAL MATERIAL USING SAME

The present application claims the benefit of Korean Patent Application No. 2003-29456 filed in Korea on May 9, 2003. The present application further incorporates by reference U.S. patent application Ser. No. 10/421,714, which has published as U.S. Patent Publication No. 2004-0011422-A1.

BACKGROUND OF THE INVENTION

1. Field of the Invention

The present invention relates to a liquid crystal dispensing system, and more particularly, to a liquid crystal dispensing system capable of preventing an inferiority of a liquid crystal display device by dispensing a precise amount of liquid crystal onto a substrate and a method of dispensing liquid crystal using the same.

2. Description of the Related Art

Recently, various portable electric devices, such as mobile phones, personal digital assistant (PDA), and note book computers, have been developed because of their small size, light weight, and power-efficient operations. Accordingly, flat panel display devices, such as liquid crystal displays (LCDs), plasma display panels (PDPs), field emission displays (FEDs), and vacuum fluorescent displays (VFDs), have been developed. Of these flat panel display devices, the LCDs are currently mass produced because of their simple driving scheme and superior image quality.

FIG. 1 is a cross sectional view of an LCD device according to the related art. In FIG. 1, an LCD device 1 comprises a lower substrate 5, an upper substrate 3, and a liquid crystal layer 7 formed therebetween. The lower substrate 5 is a driving device array substrate, and includes a plurality of pixels (not shown) and a driving device, such as a thin film transistor (TFT), formed on each pixel. The upper substrate 3 is a color filter substrate, and includes a color filter layer for reproducing real color. In addition, a pixel electrode and a common electrode are formed on the lower substrate 5 and the upper substrate 3, respectively. An alignment layer is formed on both the lower and upper substrates 5 and 3 to align liquid crystal molecules of the liquid crystal layer 7. The lower substrate 5 and the upper substrate 3 are attached along a perimeter by a sealant 9, and the liquid crystal 7 is confined within the perimeter. In operation, the liquid crystal molecules of the liquid crystal layer 7 are reoriented by the driving device formed on the lower substrate 5 to control amounts of light transmitted through the liquid crystal layer 7, thereby displaying an image.

FIG. 2 is a flow chart of a fabrication method for an LCD device according to the related art. In FIG. 2, a fabrication method includes three sub-processes for manufacturing an LCD device: a driving device array substrate process for forming the driving device on the lower substrate 5; a color filter substrate process for forming the color filter on the upper substrate 3; and a cell process.

In Step S101, a plurality of gate lines and data lines are formed on the lower substrate 5 to define a pixel area by the driving device array process, and the thin film transistor connected to both the gate line and the data line is formed on the each pixel area. In addition, a pixel electrode, which is to be connected to the thin film transistor to drive the liquid crystal layer according to a signal applied through the thin film transistor, is formed by the driving device array process. In Step S104, R, G, and B color filter layers for reproducing the color and a common electrode are formed on the upper substrate 3 by the color filter process.

In Steps S102 and S105, alignment layers are formed on the lower substrate 5 and the upper substrate 3. Then, the alignment layers are individually rubbed to induce surface anchoring (i.e. a pretilt angle and alignment direction) for the liquid crystal molecules of the liquid crystal layer 7. In Step S103, a spacer is dispersed onto the lower substrate 5 for maintaining a uniform cell gap between the lower and upper substrates 5 and 3. In Step S106, a sealant is printed along outer portions of the upper substrate 3.

In Step S107, the lower and upper substrates 5 and 3 are assembled together by compression. The lower substrate 5 and the upper substrate 3 are both made of glass substrates, and include a plurality of unit panel areas on which the driving device and the color filter layer are formed. In Step S108, the assembled upper and lower glass substrates 5 and 3 are cut into unit panels. In Step S109, liquid crystal material is injected into the gap formed between the upper and lower substrates 5 and 3 of the unit panels through a liquid crystal injection hole. The filled unit panel is completed by encapsulating the liquid crystal injection hole. In Step S110, the filled and sealed unit panel is tested.

FIG. 3 is a schematic view of a liquid crystal injection system for fabricating an LCD device according to the related art. In FIG. 3, a container 12 in which liquid crystal material 14 is contained is placed in a vacuum chamber 10, and the liquid crystal display panel 1 is located at an upper side of the container 12. Then, the vacuum chamber 10 is connected to a vacuum pump (not shown) to maintain a predetermined vacuum/pressure state within the vacuum chamber 10. In addition, a liquid crystal display panel moving device (not shown) is installed in the vacuum chamber 10 to move the liquid crystal display panel 1 from the upper side of the container 12 to a surface of the liquid crystal material 14, thereby contacting an injection hole 16 of the liquid crystal display panel 1 to the liquid crystal material 14. Accordingly, this method is commonly called as a liquid crystal dipping injection method.

When the vacuum/pressure level within the chamber 10 is decreased by an inflow of nitrogen gas ($N_2$) into the vacuum chamber 10 in the state that the injection hole 16 of the liquid crystal display panel 1 contacts the surface of the liquid crystal material 14, the liquid crystal material 14 is injected into the liquid crystal display panel 1 through the injection hole 16 by the pressure differential between the vacuum/pressure level within the liquid crystal display panel 1 and the pressure/level within the vacuum chamber 10. After the liquid crystal material 14 is completely filled into the liquid crystal display panel 1, the injection hole 16 is sealed by a sealant to seal the liquid crystal material 14 within the liquid crystal display panel 1. Accordingly, this method is called as a vacuum injection method.

However, there are several problems with both the liquid crystal dipping injection method and/or vacuum injection method. First, an overall time for injection of the liquid crystal material 14 into the panel 1 is relatively long for either method. In general, a gap thickness between the driving device array substrate and the color filter substrate in the liquid crystal display panel 1 is relatively narrow, i.e., a few micrometers. Accordingly, a relatively small amount of liquid crystal material 14 is injected into the liquid crystal display panel 1 per unit time. For example, it takes about 8 hours to completely inject the liquid crystal material 14 into a 15-inch liquid crystal display panel, and thus, fabricating efficiency is decreased. Second, consumption of the liquid crystal material 14 during the liquid crystal injection method is large. Only a small amount of the liquid crystal material 14 in the container 12 is actually injected into the liquid crystal display panel 1. Accordingly, during loading of the liquid crystal display panel 1 into the vacuum chamber 10, the unused liquid crystal material 14 is exposed to atmosphere or to certain gases, thereby contaminating the liquid crystal material 14. Thus, any remaining liquid crystal material 14 must be discarded after the injection of the liquid crystal material 14 into a plurality of liquid crystal display panels 1, thereby increasing fabricating costs.

SUMMARY OF THE INVENTION

Accordingly, the present invention is directed to a liquid crystal dispensing system and method of dispensing liquid crystal material using the same that substantially obviates one or more of the problems due to limitations and disadvantages of the related art.

An object of the present invention is to provide a liquid crystal dispensing system for directly dispensing liquid crystal onto a glass substrate of a large area including at least one liquid crystal panel and a method of dispensing liquid crystal using the same.

Another object of the present invention is to provide a liquid crystal dispensing system capable of preventing an inferiority of a liquid crystal display device by dispensing a precise amount of liquid crystal onto a substrate and a method of dispensing liquid crystal using the same.

Another object of the present invention is to provide a liquid crystal dispensing system capable of quickly compensating a dispensing amount of liquid crystal and preventing an inferiority of a substrate and a method of dispensing liquid crystal using the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal dispensing system, comprises a container to contain liquid crystal to be dispensed; a discharge pump to receive the liquid crystal from the container and to discharge the liquid crystal; a nozzle to dispense the liquid crystal discharged from the discharge pump onto a substrate; and a control unit to control a dispensing amount of liquid crystal discharged from the discharge pump and to compensate the dispensing amount when the dispensing amount of liquid crystal exceeds a limitation value.

In another aspect, a liquid crystal dispensing system, comprises a plurality of dispensers to dispense liquid crystal onto a substrate defining a plurality of unit panels; and a control unit to control a dispensing amount of liquid crystal dispensed from the liquid crystal dispenser and to compensate the dispensing amount when the dispensing amount of liquid crystal exceeds a limitation value.

In another aspect, a liquid crystal dispensing method, comprises the steps of calculating a dispensing amount and a dispensing position of liquid crystal and setting a liquid crystal dispensing system; driving a substrate and to position a liquid crystal dispensing system at the dispensing position; controlling a fixation angle of a discharge pump by driving a second motor in accordance with the calculated dispensing amount; operating the discharge pump by driving a first motor to dispense liquid crystal onto the substrate; measuring a dispensing amount of liquid crystal dispensed onto the substrate; calculating a differential value between the measured dispensing amount and the preset dispensing amount; and controlling a dispensing of liquid crystal by comparing the differential value with a limitation value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

In order to solve the problems of the related liquid crystal injection methods such as a liquid crystal dipping method or a liquid crystal vacuum injection method, a liquid crystal dropping method has been recently introduced. The liquid crystal dropping method is a method for forming a liquid crystal layer by directly dropping the liquid crystal onto the substrates and spreading the dropped liquid crystal over the entire panel by pressing together the substrates during the assembling procedure of the substrates rather than by injecting the liquid crystal into the empty unit panel by the pressure difference between the inner and outer sides of the panel. According to the above liquid crystal dropping method, the liquid crystal is directly dropped onto the substrate in a short time period so that the liquid crystal layer in a LCD of larger area can be formed quickly. In addition, the liquid crystal consumption can be minimized due to the direct dropping of the liquid crystal as much as required amount, and therefore, the fabrication cost can be reduced.

Figure 4:
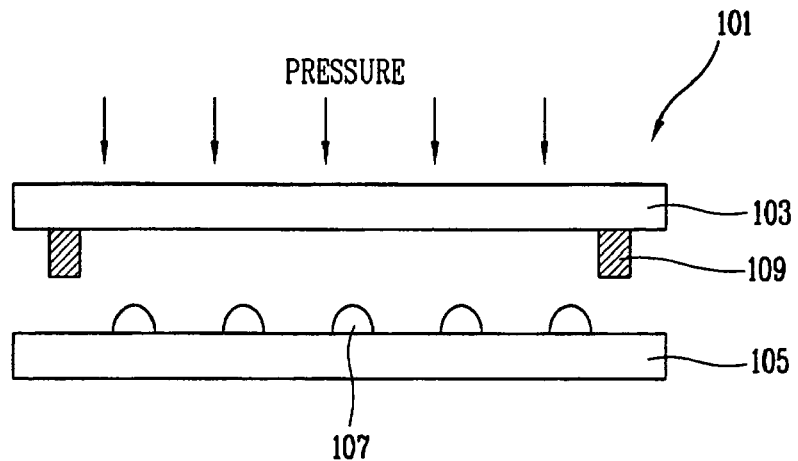
FIG. 4 is a cross sectional view of an LCD device fabricated by a liquid crystal dispensing method according to an embodiment of the present invention.

FIG. 4 is a view illustrating a basic concept of a liquid crystal dispensing method according to an embodiment of the present invention. In FIG. 4, liquid crystal material 107 may be dropped onto a lower substrate 105 having a driving device prior to assembling the lower substrate 105 and an upper substrate 103 having a color filter. Alternatively, the liquid crystal material 107 may be dropped onto the upper substrate 103 upon which the color filter is formed. For example, the liquid crystal material 107 may be formed either on a thin film transistor (TFT) substrate or on a color filter (CF) substrate.

A sealant 109 may be applied along at least an outer perimeter portion of the upper substrate 103. Then, the upper substrate 103 and the lower substrate 105 may be assembled together by pressing the upper and lower substrates 103 and 105 together to form an LCD display panel 101. Accordingly, the drops of the liquid crystal material 107 spread out between the upper and lower substrates 103 and 105 by pressure applied to the upper and/or lower substrates 103 and 105, thereby forming a liquid crystal material layer of uniform thickness between the upper substrate 103 and the lower substrate 105. Thus, in the exemplary LCD device fabrication method, the liquid crystal material 107 may be dropped onto the lower substrate 105 before the upper and lower substrates 103 and 105 are assembled together to form the LCD display panel 101.

Figure 5:
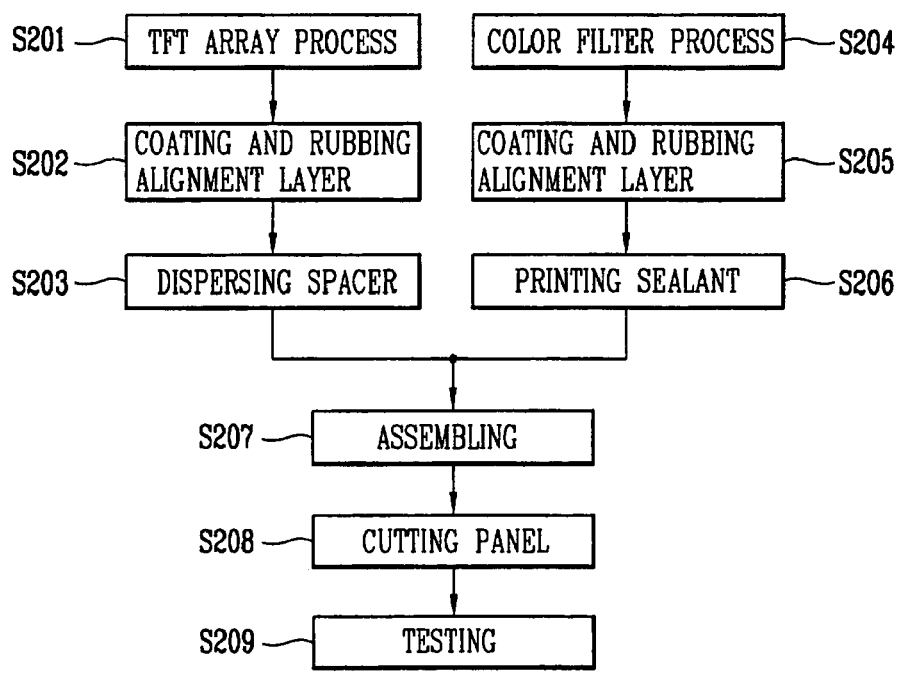
FIG. 5 is a flow chart of a fabrication method of an LCD device by a liquid crystal dispensing method according to an embodiment of the present invention.

FIG. 5 is a flow chart of an exemplary LCD device fabrication method according to an embodiment of the present invention. In Step S201, a driving device, such as a TFT, is formed on an upper substrate using a TFT array process. In Step S204, a color filter layer is formed on a lower substrate 105 using a color filter process. The TFT array process and the color filter process, which are generally similar to those of common processes, may be preferably applied to glass substrates having a plurality of unit panel areas. Herein, the upper and lower substrates may include a glass substrate having an area about 1000×1200 $mm_2$ or more. However, glass substrates having smaller areas also may be used.

In Steps S202 and S205, alignment layers may be formed and rubbed on both the upper and lower substrates. In Step S203, liquid crystal material may be dropped onto a liquid crystal display unit panel area of the lower substrate 105. In Step S206, sealant is applied along at least an outer perimeter portion area of the liquid crystal display unit panel area on the upper substrate.

In Step S207, the upper and lower substrates are disposed to face each other, and compressed to join the upper and lower substrates with each other using the sealant. Accordingly, the dropped liquid crystal material evenly spreads out between the upper and lower substrates and the sealant. In Step S208, the assembled upper and lower substrates are processed and cut into a plurality of liquid crystal display unit panels. In Step S209, the liquid crystal display unit panels are tested.

Figure 1:
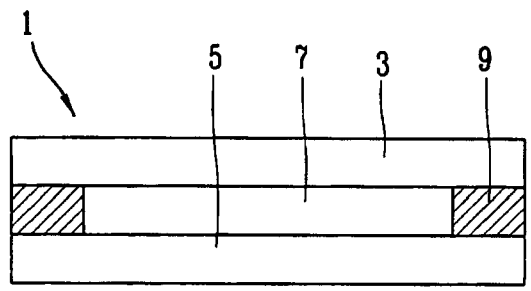
FIG. 1 is a cross sectional view of a liquid crystal display (LCD) device according to the related art.
Figure 2:
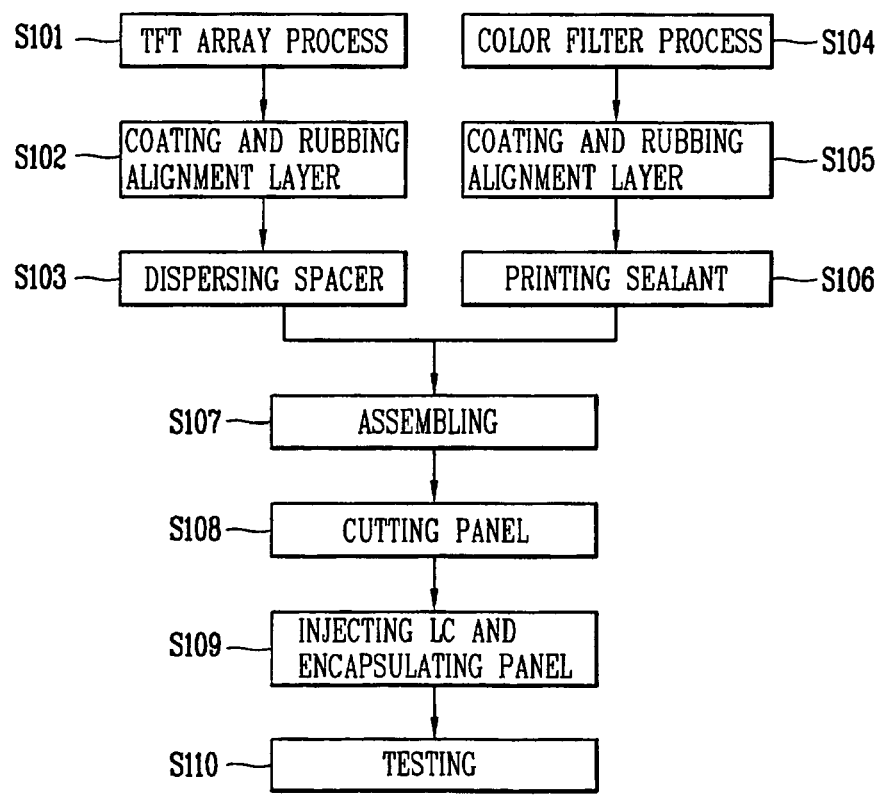
FIG. 2 is a flow chart of a fabrication method for an LCD device according to the related art.
Figure 3:
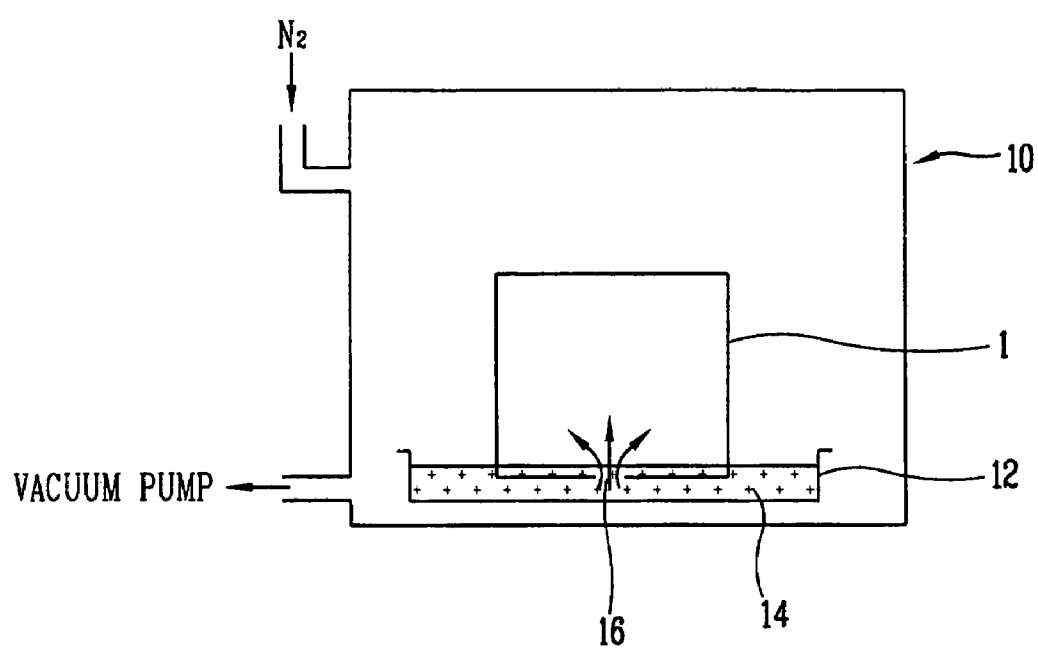
FIG. 3 is a schematic view of a liquid crystal injection system for fabricating an LCD device according to the related art.

The LCD device fabrication method using the liquid crystal dropping method of FIG. 5 is different from the LCD device fabrication method using the related art liquid crystal injection method in that a vacuum injection of liquid crystal is not used but rather a liquid crystal dropping, thereby reducing the processing time of a large area glass substrate. That is, in the LCD device fabrication method using the liquid crystal injection method of FIG. 2, liquid crystal is injected through an injection hole and then the injection hole is encapsulated by an encapsulation material. However, in the LCD device fabrication method using the liquid crystal dropping method, liquid crystal is directly dropped onto the substrate and does not require the process sealing of the injection hole. Although not shown in FIG. 2, in the LCD device fabrication method using the liquid crystal injection method, the substrate is contacting the liquid crystal at the time of injecting liquid crystal so that an outer surface of the panel is contaminated by the liquid crystal. Therefore, a process for washing the contaminated substrate is required. However, in the LCD device fabrication method using the liquid crystal dropping method, liquid crystal is directly dropped onto the substrate so that the panel is not contaminated by the liquid crystal, and a washing process is not required. The LCD device fabrication method using the liquid crystal dropping method is more simple than the LCD device fabrication method using the liquid crystal injection method, thereby having an increased fabricating efficiency and an increased yield.

In the LCD device fabrication method using the liquid crystal dropping method, a dropping position of liquid crystal and a dropping amount of liquid crystal have the most influence on forming a liquid crystal layer with a desired thickness. Especially, since the thickness of a liquid crystal layer is closely related to a cell gap of a liquid crystal panel, a precise dropping position of liquid crystal and a precise amount of liquid crystal are very important to prevent inferiority of a liquid crystal panel. To drop a precise amount of liquid crystal onto a precise position, a liquid crystal dispenser is provided in the present invention.

Figure 6:
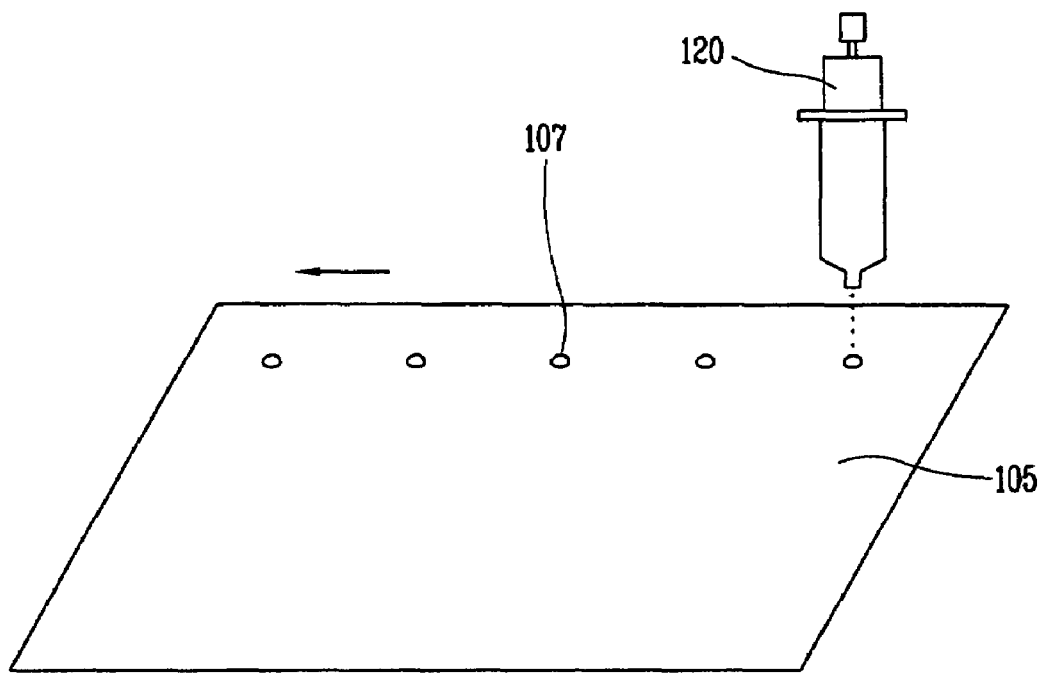
FIG. 6 is a view of a basic concept of a liquid crystal dispensing method.

FIG. 6 is a perspective view of another exemplary LCD device fabrication method according to an embodiment of the present invention. In FIG. 6, liquid crystal material 107 is dispensed onto a glass substrate 105 using a liquid crystal dispenser 120 positioned above the glass substrate 105. Although not shown, the liquid crystal material 107 may be contained in the liquid crystal dispenser 120. As the liquid crystal material 107 is dropped onto the glass substrate 105, the glass substrate 105 is moved along x- and y-directions at a predetermined speed, while the liquid crystal dispenser 120 discharges the liquid crystal material 107 at predetermined time intervals. Accordingly, the liquid crystal material 107 dropping onto the glass substrate 105 may be arranged along x- and y-directions with predetermined intervals therebetween. Alternatively, the glass substrate 105 may be fixed while the liquid crystal dispenser 120 moves along the x- and y-directions to drop the liquid crystal material 107 at predetermined intervals. However, a shape of the liquid crystal material 107 may be altered by any vibration of the liquid crystal dispenser 120, whereby errors in the dropping position and the dropping amount of the liquid crystal material 107 may occur. Therefore, it may be preferable that the liquid crystal dispenser 120 be fixed and that the glass substrate 105 be moved.

Figure 7:
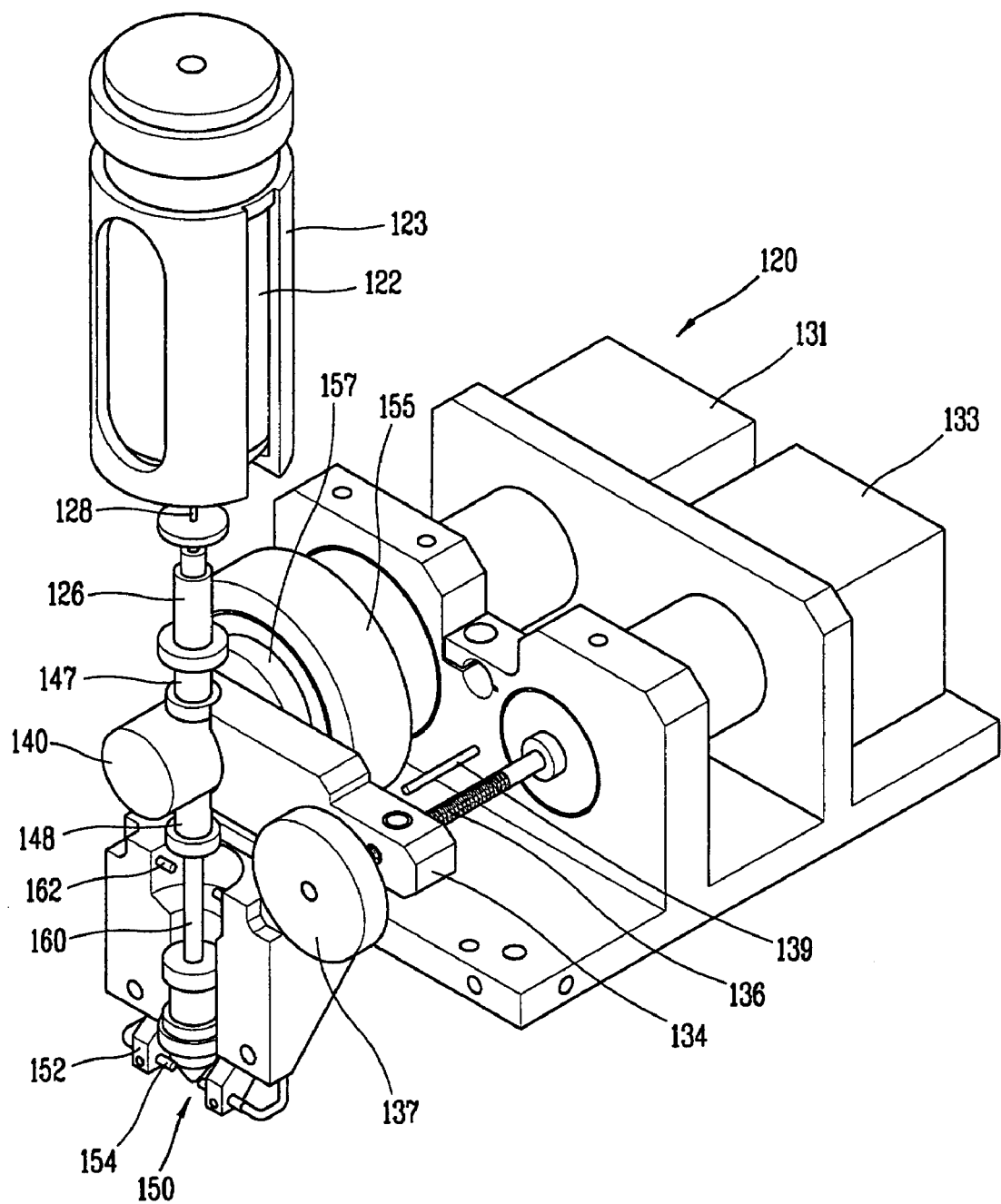
FIG. 7 is a perspective view of a liquid crystal dispenser according to an embodiment of the present invention.
Figure 8:
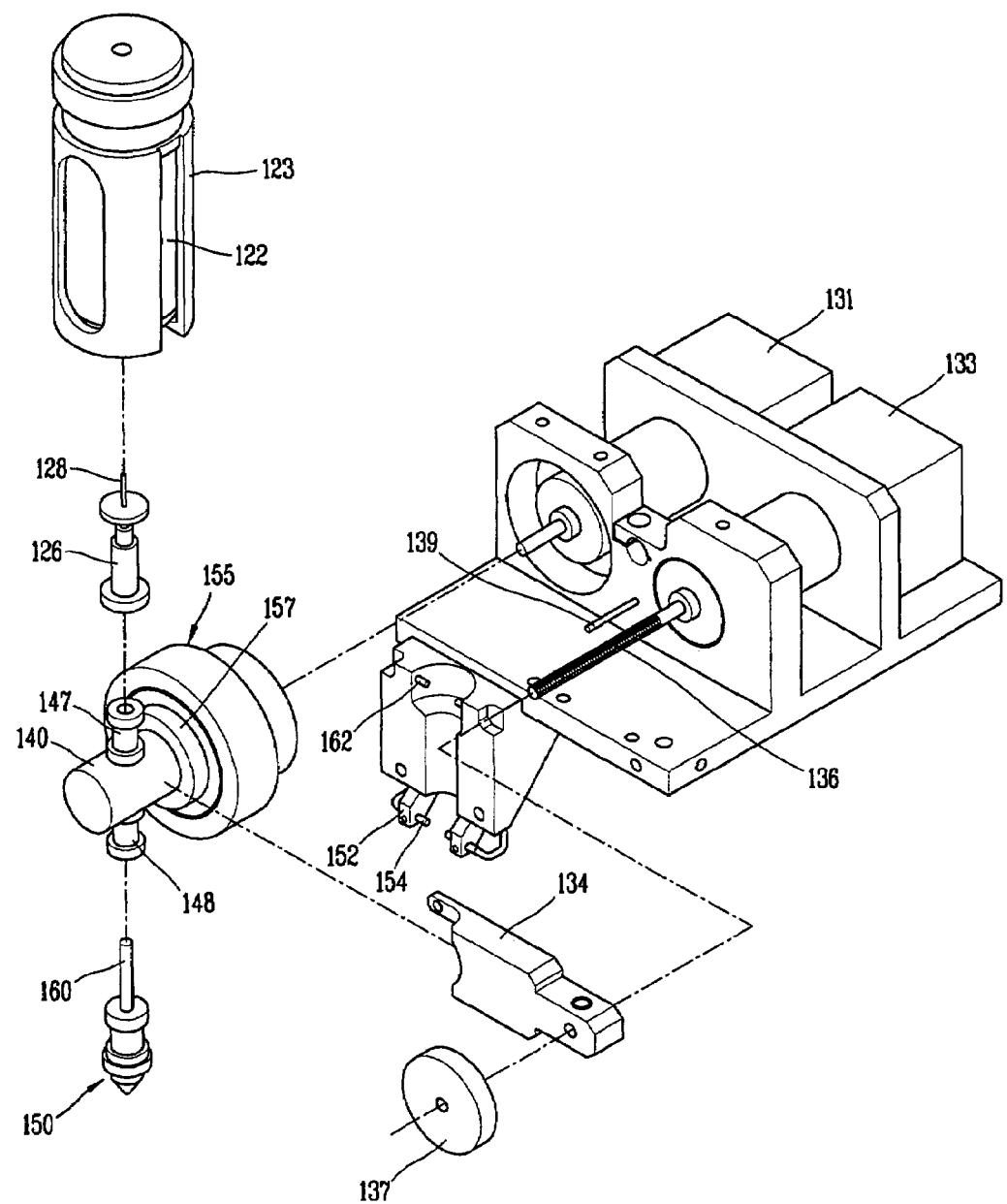
FIG. 8 is a disassembled perspective view of the liquid crystal dispenser according to an embodiment of the present invention.

FIG. 7 is a perspective view of the liquid crystal dispenser according to an embodiment of the present invention, and FIG. 8 is a disassembled perspective view of the liquid crystal dispenser according to an embodiment of the present invention. In FIGS. 7A and 7B, the liquid crystal dispenser 120 may include a cylindrically shaped liquid crystal material container 122 accommodated in a case 123. The liquid crystal material container 122 is formed of polyethylene, and the liquid crystal 107 is contained in the liquid crystal material container 122. The case 123 is formed of a stainless steel and accommodates the liquid crystal material container 122 therein. Since the polyethylene has a high plasticity, a container of a desired shape can be easily formed with the polyethylene. Also, the polyethylene is non-reactive with the liquid crystal material 107 when the liquid crystal material 107 is contained therein, thereby being mainly used as the liquid crystal material container 122. However, the polyethylene has a low strength and may therefore become easily deformed by application of stress. When the liquid crystal material container 122 is deformed, the liquid crystal material 107 may not be precisely dispensed onto a substrate. Accordingly, the liquid crystal material container 122 may be inserted within the case 123 formed of stainless steel having a high strength.

Although not shown, a gas supply tube may be arranged at an upper portion of the liquid crystal material container 122 so that inert gas, such as nitrogen, may be provided thereto. The gas is supplied within portions of the liquid crystal material container 122 not occupied by the liquid crystal material 107. Accordingly, the gas presses on the liquid crystal material 107 and induces the liquid crystal material to be dispensed onto the substrate.

The liquid crystal material container 122 may include a material that does not deform, such as stainless steel. Accordingly, when the liquid crystal material container 122 is formed out of stainless steel, the case 123 may not be required, thereby reducing fabrication costs of the liquid crystal dispenser 120. The interior of the liquid crystal material container 122 may be coated with a fluorine resin, thereby preventing the liquid crystal material 107 contained within the liquid crystal material container 122 from chemically reacting with sidewalls of the liquid crystal material container 122.

A liquid crystal discharge pump 140 is arranged at a lower portion of the liquid crystal material container 122. The liquid crystal discharge pump 140 is for discharging a certain amount of liquid crystal from the liquid crystal material container 122 to be dropped onto a substrate. The liquid crystal discharge pump 140 is provided with a liquid crystal suction opening 147 connected to the liquid crystal material container 122 for drawing in liquid crystal in accordance with the operation of the liquid crystal discharge pump 140, and a liquid crystal discharge opening 148 at the opposite side of the liquid crystal suction opening 147 for discharging liquid crystal in accordance with the operation of the liquid crystal discharge pump 140.

In FIG. 8, a first connecting tube 126 is coupled to the liquid crystal suction opening 147. Although the liquid crystal suction opening 147 is coupled to the first connecting tube 126 by being inserted in drawing, the liquid crystal suction opening 147 can be coupled to the first connecting tube 126 by a coupling member such as a screw. A pin 128 such as an injection needle of which inside is penetrated is formed at one side of the first connecting tube 126. A pad (not shown) formed of a material having a high contraction characteristic and a hermetic characteristic such as silicon or butyl rubber group is arranged at a lower portion of the liquid crystal material container 122 for discharging liquid crystal to the first connecting tube 126. The pin 128 is inserted into the liquid crystal material container 122 through the pad, thereby introducing the liquid crystal 107 of the liquid crystal material container 122 into the liquid crystal suction opening 147. When the pin 128 is inserted into the liquid crystal material container 122, the pad forms a seal around the pin 128, thereby preventing leakage of the liquid crystal 107 to the insertion region of the pin 128. Since the liquid crystal suction opening 147 and the liquid crystal material container 122 are coupled to each other by the pin and the pad, the coupling structure is simple and the coupling/detachment is facilitated. Alternatively, the liquid crystal suction opening 147 and the first connecting tube 126 may be formed as a unit. In this case, the pin 128 is formed at the liquid crystal suction opening 147 and is directly inserted into the liquid crystal material container 122 to discharge liquid crystal, thereby having a simple structure.

A nozzle 150 is formed at a lower portion of the liquid crystal discharge pump 140. The nozzle 150 is connected to the liquid crystal discharge opening 148 of the liquid crystal discharge pump 140 through a second connecting tube 160, thereby dropping the liquid crystal 107 discharged from the liquid crystal discharge pump 140 onto the substrate. The second connecting tube 160 may be formed of an opaque material. However, the second connecting tube 160 is formed of a transparent material due to the following reasons.

At the time of the liquid crystal dropping, vapor is contained in the liquid crystal 107 and a dispensing amount of the liquid crystal 107 dispensed onto the substrate can not be precisely controlled. Therefore, the vapor has to be removed at the time of the liquid crystal dropping. The vapor is already contained in the liquid crystal 107 to be contained in the liquid crystal material container 122. Even if the vapor contained in the liquid crystal 107 can be removed by a vapor removing device, the vapor is not completely removed. Also, vapor may be generated when the liquid crystal 107 is introduced into the liquid crystal discharge pump 140 from the liquid crystal material container 122. Accordingly, it is impossible to completely remove the vapor contained in the liquid crystal 107. Therefore, it is the best method to remove vapor by stopping the operation of the liquid crystal dispenser at the time of the vapor occurrence. The reason why the second connecting tube 160 is formed of a transparent material is to prevent inferiority of the LCD device by easily finding vapor contained in the liquid crystal material container 122 or vapor generated from the liquid crystal material container 122. The vapor can be found by the user's naked eyes, and can be automatically detected by a first sensor 162 such as a photo coupler installed at both sides of the second connecting tube 160, in which the latter case can prevent the inferiority of the LCD device more certainly.

The nozzle 150 into which the discharged liquid crystal is introduced through the second connecting tube 160 is provided with a protection unit 152 for protecting the nozzle 150 from external stress and etc. at both side surfaces thereof. Also, a second sensor 154 for detecting whether vapor is contained in the liquid crystal dropped from the nozzle 150 or whether liquid crystal masses on the surface of the nozzle 150 is installed at the protection unit 154 at the lower portion of the nozzle 150.

The phenomenon that the liquid crystal masses on the surface of the nozzle 150 prevents a precise dropping of the liquid crystal 107. When the liquid crystal drops through the nozzle 150, a certain amount of liquid crystal spreads on the surface of the nozzle 150 even if a preset amount of liquid crystal is discharged from the liquid crystal discharge pump 140. According to this, liquid crystal of less amount than the preset amount is dispensed onto the substrate. Also, when the liquid crystal that masses on the surface of the nozzle 150 drops on the substrate, inferiority of the LCD device may be generated. To prevent the liquid crystal from massing on the surface of the nozzle 150, material such as fluorine resin having a high contact angle with liquid crystal, that is a hydrophobic material, may be deposited on the surface of the nozzle 150 by a dipping method or a spray method. By the deposition of the fluorine resin, the liquid crystal does not spread on the surface of the nozzle 150, but is dispensed onto the substrate through the nozzle 150 as a perfect drop shape.

The liquid crystal discharge pump 140 is in a state of being inserted into a rotating member 157, and the rotating member 157 is fixed to a fixing unit 155. The rotating member 157 is connected to a first motor 131. As the first motor 131 is operated, the rotating member 157 is rotated and the liquid crystal discharge pump 140 fixed to the rotating member 157 is operated.

The liquid crystal discharge pump 140 is in contact with one side of a liquid crystal capacity amount controlling member 134 having a bar shape. A hole is formed at another side of the liquid crystal capacity amount controlling member 134, and a rotational shaft 136 is inserted into the hole. A screw is formed at the perimeter of the hole of the liquid crystal capacity amount controlling member 134 and the rotational shaft 136, so that the liquid crystal capacity amount controlling member 134 and the rotational shaft 136 are screw-coupled to each other. One end of the rotational shaft 136 is connected to a second motor 133, and another end thereof is connected to a controlling lever 137.

The discharge amount of liquid crystal from the liquid crystal material container 122 through the liquid crystal discharge pump 140 is varied according to a fixation angle of the liquid crystal discharge pump 140 to the rotating member 157. That is, a liquid crystal capacity amount of the liquid crystal discharge pump 140 is varied according to an angle that the liquid crystal discharge pump 140 is fixed to the rotating member 157. When the second motor 133 connected to the rotational shaft 136 is driven (automatically controlled) or the controlling lever 137 is operated (manually controlled), the rotational shaft 136 is rotated. According to this, one end of the liquid crystal capacity amount controlling member 134 screw-coupled to the rotational shaft 136 moves back and forth (linear direction) along the rotational shaft 136. Accordingly, as one end of the liquid crystal capacity amount controlling member 134 moves, a force applied to the liquid crystal discharge pump 140 is varied, and therefore, the fixation angle of the liquid crystal discharge pump 140 is varied.

As aforementioned, the first motor 131 operates the liquid crystal discharge pump 140 to discharge liquid crystal of the liquid crystal material container 122 and to drop the liquid crystal onto the substrate. Also, the second motor 133 controls the fixation angle of the liquid crystal discharge pump 140 fixed to the rotating member 157 to control the amount of liquid crystal discharged from the liquid crystal discharge pump 140.

A single dispensing amount of liquid crystal dropped onto the substrate through the liquid crystal discharge pump 140 is very minute, and therefore, a variation amount of the liquid crystal discharge pump 140 controlled by the second motor 133 is also minute. Accordingly, to control the discharge amount of the liquid crystal discharge pump 140, an inclination angle of the liquid crystal discharge pump 140 has to be controlled very precisely. For the precise control, a step motor operated by a pulse input value is used as the second motor 133.

Figure 9A:
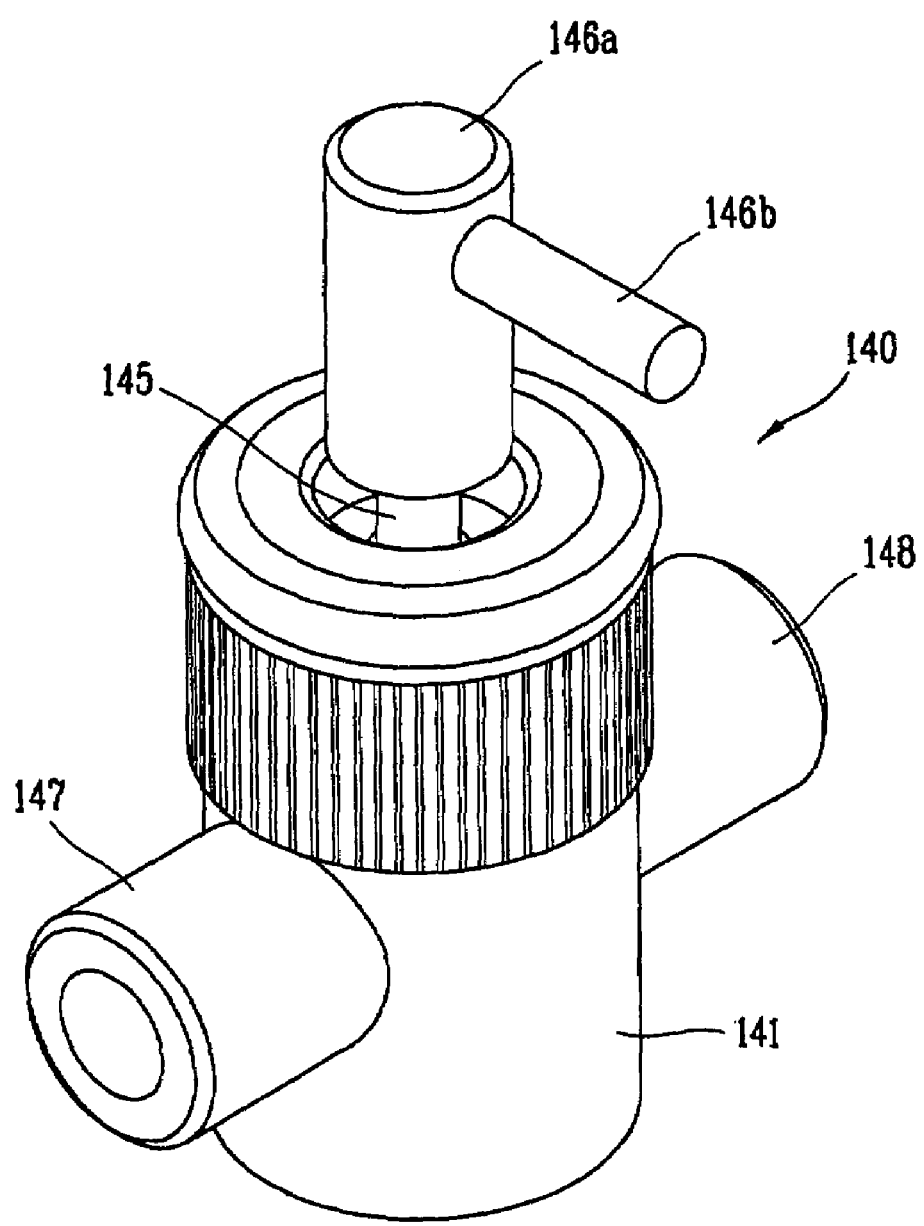
FIG. 9A is a perspective view of a liquid crystal discharge pump of the liquid crystal dispenser according to an embodiment of the present invention.
Figure 9B:
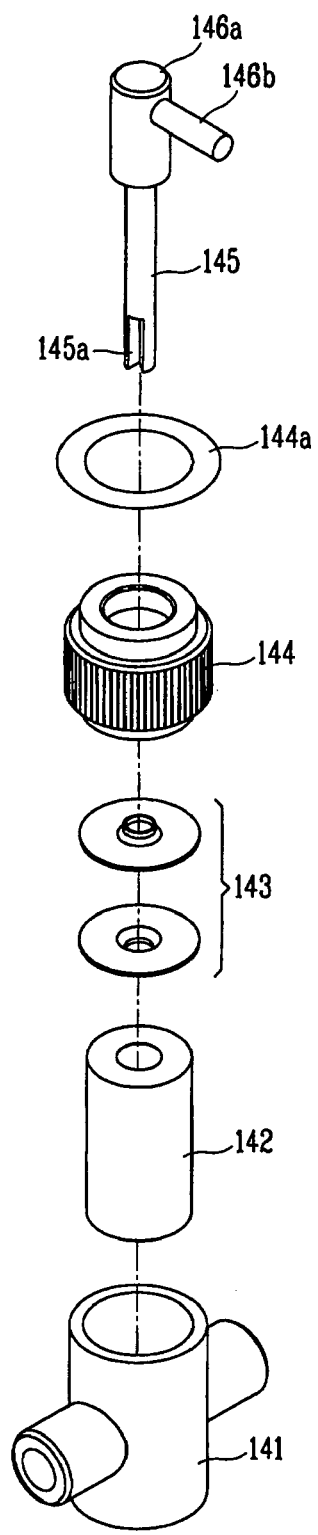
FIG. 9B is a disassembled perspective view of the liquid crystal discharge pump.

FIG. 9A is a perspective view of the liquid crystal discharge pump, and FIG. 9B is a disassembled perspective view of the liquid crystal discharge pump. In FIGS. 9A and 9B, the liquid crystal discharge pump 140 includes: a case 141 having the liquid crystal suction opening 147 and the liquid crystal discharge opening 148; a cap 144 having an opening at an upper portion thereof and coupled to the case 141; a cylinder 142 inserted into the case 141 for drawing in liquid crystal; a sealing member 143 for sealing the cylinder 142; an o-ring 144a positioned above the cap 144 for preventing liquid crystal from being leaked; and a piston 145 up-down moved and rotated by being inserted into the cylinder 142 through the opening of the cap 144, for drawing in and discharging the liquid crystal 107 through the liquid crystal suction opening 147 and the liquid crystal discharge opening 148. A head 146a fixed to the rotating member 157 is installed above the piston 145, and a bar 146b is installed at the head 146a. The bar 146b is inserted into a hole (not shown) of the rotating member 157 and is fixed, thereby rotating the piston 145 when the rotating member 157 is rotated by a force of the first motor 131.

In FIG. 9B, a groove 145a is formed at the end of the piston 145. The groove 145a has an area corresponding to approximately ¼ (or less than that) of a sectional area of a circle shape of the piston 145. The groove 145a opens and closes the liquid crystal suction opening 147 and the liquid crystal discharge opening 148 when the piston 145 is rotated (that is, up and down moved), thereby drawing in and discharging liquid crystal through the liquid crystal suction opening 147 and the liquid crystal discharge opening 148.

Operation of the liquid crystal discharge pump 140 will be explained as follows.

Figure 10:
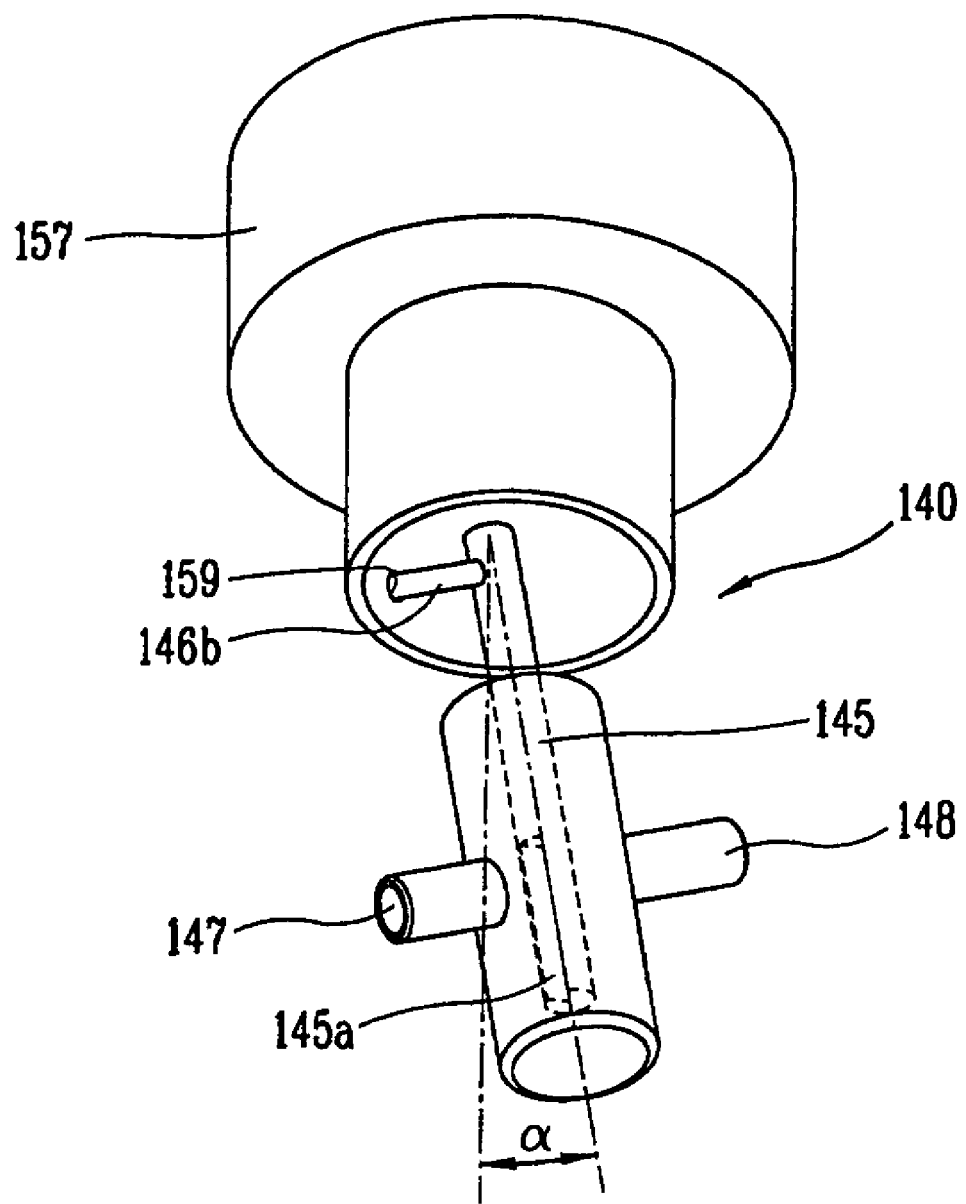
FIG. 10 is a view showing a state that the liquid crystal discharge pump is fixed to a fixing unit.

FIG. 10 is a view showing a state that the liquid crystal discharge pump 140 is fixed to the rotating member 157. In FIG. 10, the piston 145 is fixed to the rotating member 157 with a certain angle ($\alpha$). The bar 146b formed at the piston head 146a is inserted into a hole 159 formed inside the rotating member 157, so that the piston 145 and the rotating member 157 are coupled to each other. Although not shown, a bearing is provided inside the hole 159 and thereby the bar 146b of the piston 145 inserted into the hole 159 can move back and forth and right and left. When the first motor 131 is operated, the rotating member 157 is rotated and thereby the piston 145 coupled to the rotating member 157 is rotated.

Herein, if the fixation angle ($\alpha$) of the liquid crystal discharge pump for the rotating member 157, that is, the fixation angle (α) of the piston 145 for the rotating member 157 is supposed to be 0, the piston 145 performs only a rotational motion along the rotating member 157. However, since the fixation angle (α) of the piston 145 is not 0, substantially (that is, the piston 145 is fixed with a certain angle), the piston 145 not only rotates along the rotating member 157 but also up-down moves.

If the piston 145 moves upwardly by rotating with a certain angle, a space is formed inside the cylinder 142 and liquid crystal is drawn into the space through the liquid crystal suction opening 147. Then, if the piston 145 moves downwardly by rotating more, the liquid crystal in the cylinder 142 is discharged through the liquid crystal discharge opening 148. Herein, the groove 145a formed at the piston 145 opens and closes the liquid crystal suction opening 147 and the liquid crystal discharge opening 148 at the time of sucking and discharging the liquid crystal by the rotation of the piston 145.

Figure 11A:
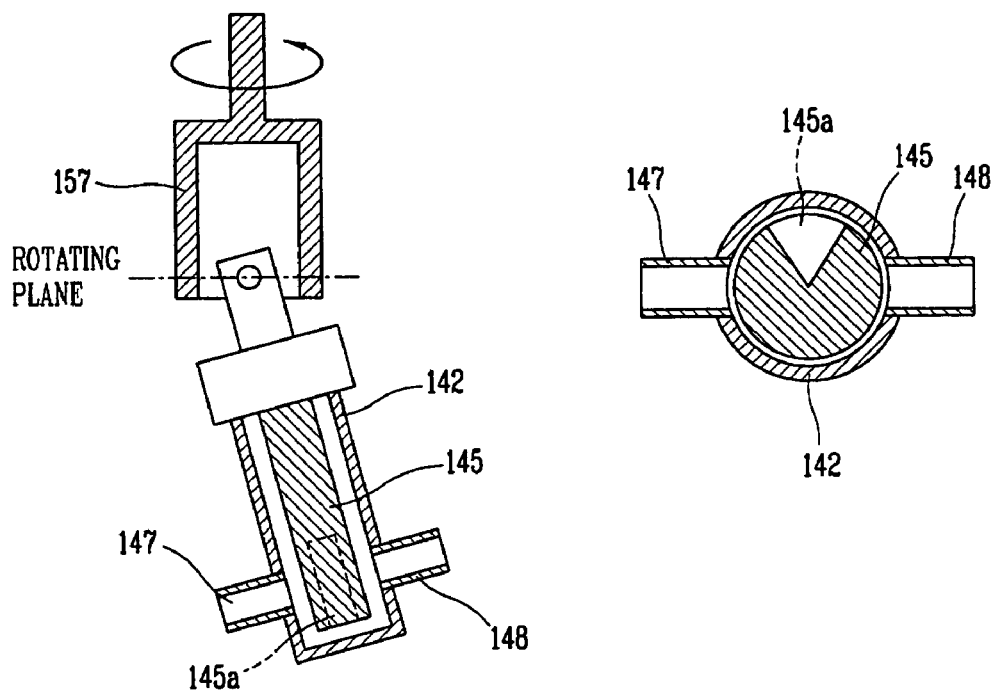
FIGS. 11A to 11D are operational views of the liquid crystal discharge pump.
Figure 11B:
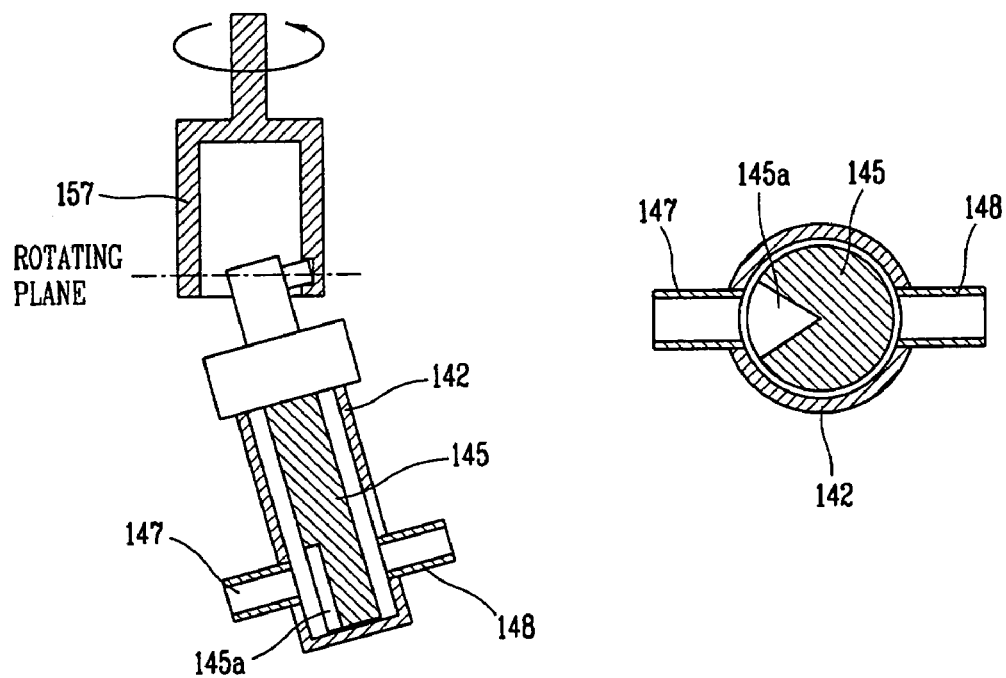
Figure 11C:
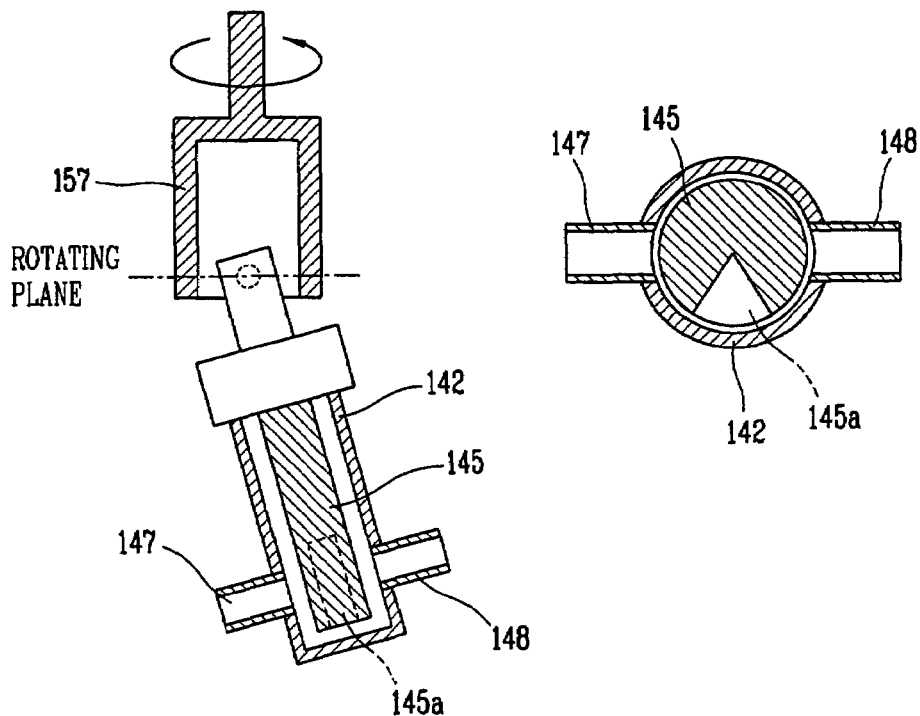
Figure 11D:
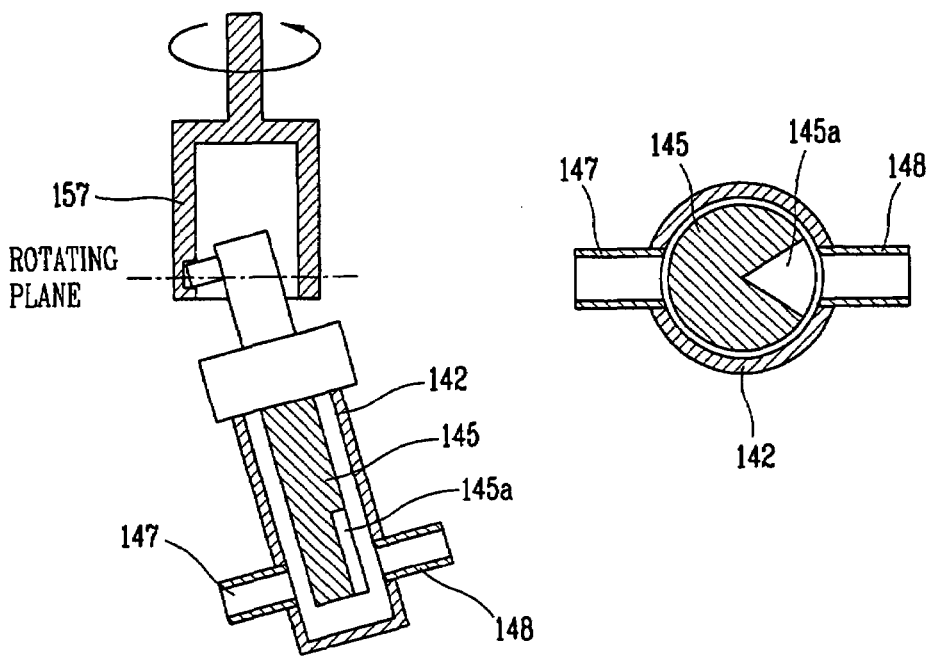

Hereinafter, operation of the liquid crystal disc charge pump 140 will be explained in more detail with reference to FIGS. 11A to 11D. In FIGS. 11A to 11D, the liquid crystal discharge pump 140 discharges the liquid crystal 107 of the liquid crystal material container 122 to the nozzle 150 through 4 strokes. FIGS. 11A and 11C are cross strokes, FIG. 11B is a suction stroke through the liquid crystal suction opening 147, and FIG. 11D is a discharge stroke through the liquid crystal discharge opening 148.

In FIG. 11A, the piston 145 fixed to the rotating member 157 with a certain angle (α) rotates accordingly as the rotating member 157 rotates. At this time, the liquid crystal suction opening 147 and the liquid crystal discharge opening 148 are closed by the piston 145.

When the rotating member 157 rotates with approximately 45°, the piston 145 rotates and the liquid crystal suction opening 147 is open by the groove 145a of the piston 145 as shown in FIG. 11B. The bar 146b of the piston 145 is inserted into the hole 159 of the rotating member 157, thereby coupling the rotating member 157 and the piston 145. Accordingly, as the rotating member 157 rotates, the piston 145 rotates. At this time, the bar 146b rotates along a rotating plane.

Since the piston 145 is fixed to the rotating member 157 with a certain angle and the bar 146b rotates along the rotating plane, the piston 145 moves upwardly accordingly as the rotating member 157 rotates. Also, accordingly as the rotating member 157 rotates, a space is formed at the cylinder 142 positioned at the lower portion of the piston 145 since the cylinder 142 is fixed. Therefore, liquid crystal is drawn into the space through the liquid crystal suction opening 147 that has been open by the groove 145a. The suction stroke of liquid crystal continues until the suction stroke of FIG. 11C starts (the liquid crystal suction opening 147 is closed) as the rotating member 157 rotates with approximately 45° after the suction stroke starts (that is, the liquid crystal suction opening 147 is open).

Then, as shown in FIG. 11D, the liquid crystal discharge opening 148 is open and the piston 145 downwardly moves accordingly as the rotating member 157 rotates more, so that the liquid crystal sucked into the space inside the cylinder 142 is discharged through the liquid crystal discharge opening 148 (discharge stroke). As aforementioned, the liquid crystal discharge pump 140 repeats four strokes that is, the first cross stroke, the suction stroke, the second cross stroke, and the discharge stroke, thereby discharging the liquid crystal 107 contained in the liquid crystal material container 122 to the nozzle 150. Herein, the discharge amount of liquid crystal is varied according to an up-down motion range of the piston 145. The up-down motion range of the piston 145 is varied according to the angle of the liquid crystal discharge pump 140 fixed to the rotating member 157.

Figure 12:
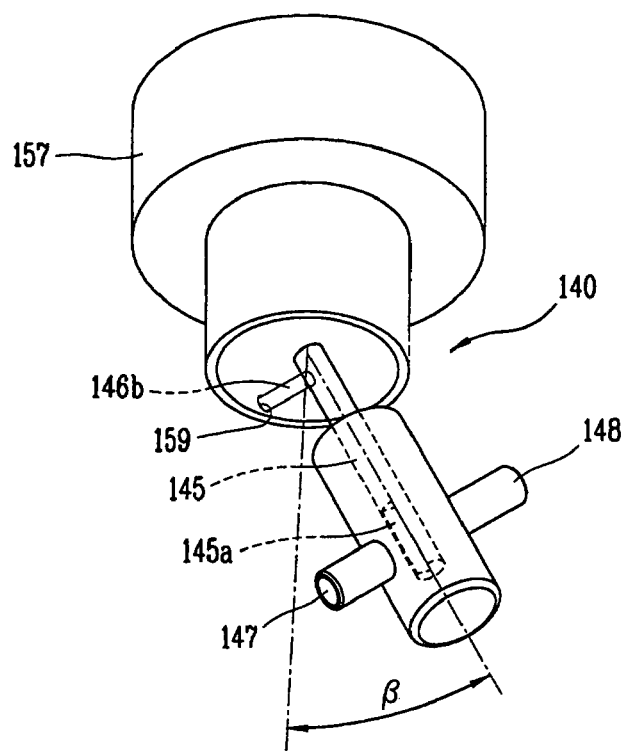
FIG. 12 is a view of the liquid crystal discharge pump of which a fixation angle has been increased.

FIG. 12 is a view showing that the liquid crystal discharge pump is fixed to the rotating member with an angle of β. When compared to the liquid crystal discharge pump 140 of FIG. 10 fixed to the rotating member 157 with the angle of α, the liquid crystal discharge pump 140 of FIG. 12 fixed to the rotating member 157 with an angle of β(>α) enables the piston 145 to upwardly move more highly. That is, the more the angle of the liquid crystal discharge pump 140 fixed to the rotating member 157 is, the more the amount of the liquid crystal 107 drawn into the cylinder 142 at the time of the piston motion is. This means that the discharge amount of liquid crystal can be controlled by adjusting the angle of the liquid crystal discharge pump 140 fixed to the rotating member 157.

The angle of the liquid crystal discharge pump 140 fixed to the rotating member 157 is controlled by the liquid crystal capacity amount controlling member 134 of FIG. 7, and the liquid crystal capacity amount controlling member 134 is moved by driving the second motor 133. That is, the angle of the liquid crystal discharge pump 140 fixed to the rotating member 157 is controlled by controlling the second motor 133.

The fixation angle of the liquid crystal discharge pump 140 can be manually adjusted by handling the angle controlling lever 137 by the user. However, in this case, a precise adjustment is not possible, a lot of time is required, and the driving of the liquid crystal discharge pump has to be stopped during the operation. Therefore, it is preferable to adjust the fixation angle of the liquid crystal discharge pump 140 by the second motor 133. The fixation angle of the liquid crystal discharge pump 140 is measured by a sensor 139 such as a linear variable differential transformer. If the fixation angle exceeds a preset angle, the sensor 139 rings the alarm thus to prevent the liquid crystal discharge pump 140 from being damaged. Although not shown, the second motor 133 is connected to a control unit by wire or wirelessly. Each kind of information such as a preset dispensing amount of liquid crystal and a substantially dropped amount of liquid crystal onto the substrate is input to the control unit, and a discharge amount of liquid crystal (dropped amount of liquid crystal onto the substrate) is controlled based on the inputted information.

Figure 13:
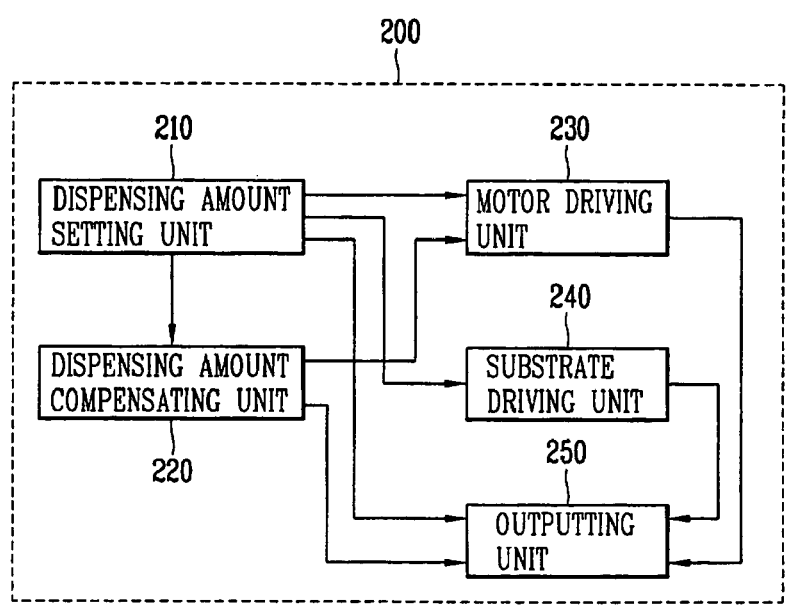
FIG. 13 is a block diagram of a control unit of a liquid crystal dispensing system according to an embodiment of the present invention.

In FIG. 13, the control unit 200 includes: a dispensing amount setting unit 210 for setting a dispensing amount of liquid crystal to be dropped onto the liquid crystal panel; a dispensing amount compensating unit 220 for compensating a dispensing amount of liquid crystal by controlling the second motor 133 and controlling the fixation angle of the liquid crystal discharge pump 140 when the preset dispensing amount of liquid crystal by the dispensing amount setting unit 210 is different from a substantial dispensing amount of liquid crystal onto the liquid crystal panel; a motor driving unit 230 for discharging the preset dispensing amount of liquid crystal by the dispensing amount setting unit 210 by the liquid crystal discharge pump 140 by controlling the first motor 131 and the second motor 133; a substrate driving unit 240 for driving the substrate and thereby aligning a dropping position of liquid crystal with the nozzle 150; and an outputting unit 250 for outputting each kind of information such as a substrate size, a panel size, a preset dispensing amount of liquid crystal, a current dispensing amount of liquid crystal, a dispensing position, and etc. and ringing an alarm at the time of an abnormality occurrence.

The outputting unit 250 is formed of a display such as a cathode ray tube (CRT) or an LCD and a printer, thereby informing the user each kind of information regarding a dropping of liquid crystal and informing the user a dropping abnormality by an alarm and etc. The dispensing amount setting unit 210 is for setting a dispensing amount of liquid crystal dispensed onto the liquid crystal panel. An already calculated set amount can be manually input to the dispensing amount setting unit 210 by the user. However, for more precise dispensing amount setting, an optimum dispensing amount is automatically set on the basis of each kind of data.

Figure 14:
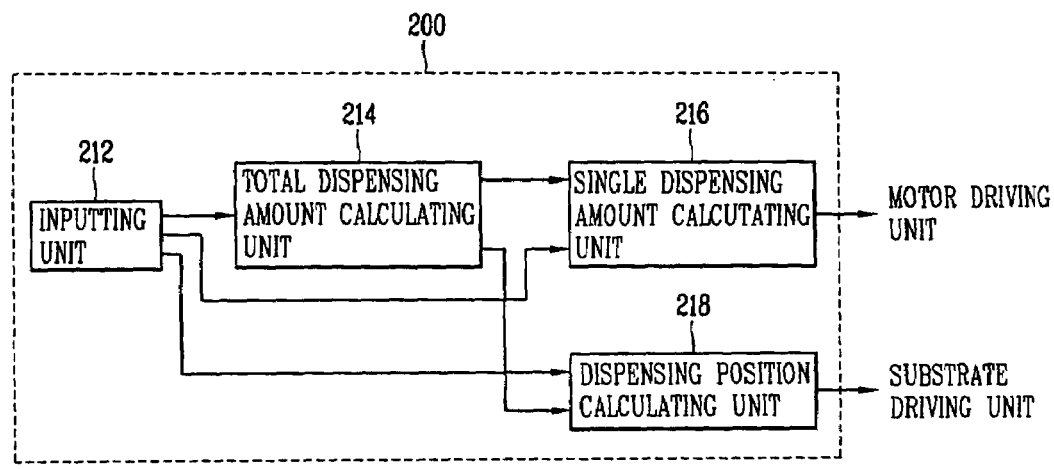
FIG. 14 is a block diagram of a dispensing amount setting unit.

As shown in FIG. 14, the dispensing amount setting unit 210 includes: an inputting unit 212 for inputting each kind of data such as a size of a liquid crystal panel to be fabricated, a number of sheets of liquid crystal panels included in the substrate. A cell gap of the liquid crystal panel (that is, a spacer height), and liquid crystal information; a total dispensing amount calculating unit 214 for calculating a total dispensing amount of liquid crystal to be dispensed onto the liquid crystal panel and onto the substrate where a plurality of liquid crystal panels are formed based on the data inputted to the input unit 212; a single dispensing amount calculating unit 216 for calculating a single dispensing amount of liquid crystal based on the calculated total dispensing amount of liquid crystal; and a dispensing position calculating unit 218 for calculating a dispensing position of liquid crystal based on the calculated total dispensing amount of liquid crystal.

The inputting unit 212 is for inputting data by a general controlling means such as a key board, a mouse, a touch panel, and etc. Data such as a size of a liquid crystal panel to be fabricated, a size of a substrate, a cell gap of a liquid crystal panel, and etc. is input to the inputting unit 212 by the user. The total dispensing amount calculating unit 214 calculates a dispensing amount (Q) of liquid crystal onto the liquid crystal panel based on an input panel size (d) and a cell gap (t) (Q=dxt), and calculates a total dispensing amount of liquid crystal to be dispensed onto the substrate based on the number of panel sheets formed onto the substrate.

A single dispensing amount of liquid crystal and a dispensing position of liquid crystal are determined based on a spread speed and a spread region of liquid crystal. The spread speed and the spread region of liquid crystal are determined based on an area of a panel onto which liquid crystal is dispensed, a liquid crystal characteristic such as a viscosity, and a substrate characteristic such as a pattern alignment. The single dispensing amount calculating unit 216 calculates a single dispensing amount of liquid crystal based on the calculated total dispensing amount of liquid crystal, the panel area, the liquid crystal characteristic, and the substrate characteristic. Also, the dispensing position calculating unit 218 calculates a spread region of a dispensed liquid crystal based on a dispensing amount of liquid crystal to be dispensed, a liquid crystal characteristic, and a substrate characteristic, thereby calculating a dispensing position of liquid crystal.

The calculated single dispensing amount and the dispensing position of liquid crystal are respectively input to the motor driving unit 230 and the substrate driving unit 240. A dispensing amount of liquid crystal dispensed onto the substrate is generally very minute as several mg. To precisely dispense the minute amount of liquid crystal is very difficult, and the amount is easily varied according to each kind of factor.

Figure 15:
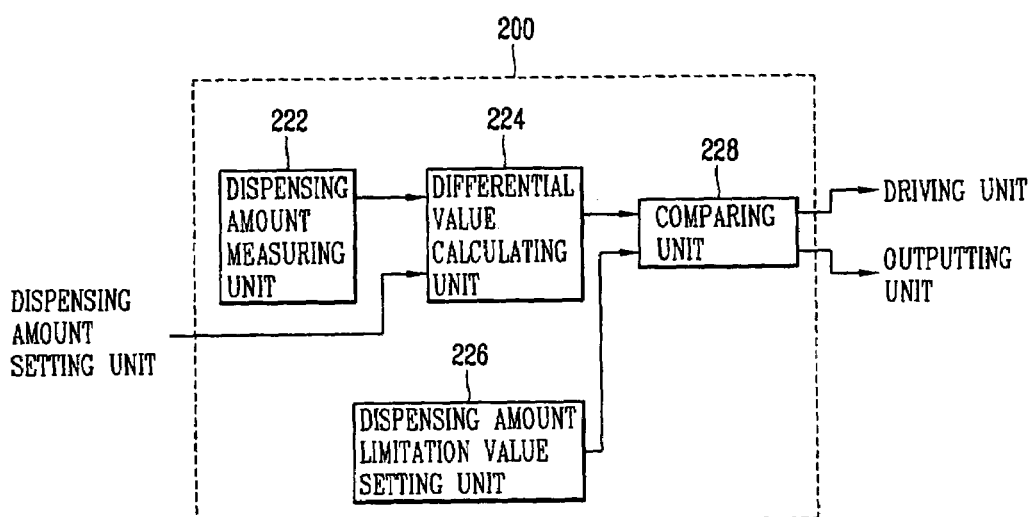
FIG. 15 is a block diagram of a dispensing amount compensating unit.

In FIG. 15, the dispensing amount compensating unit 220 for compensating a varied preset amount of liquid crystal includes: a dispensing amount measuring unit 222 for measuring a substantial dispensing amount of liquid crystal dispensed onto the liquid crystal panel; a differential value calculating unit 224 for calculating a differential value between a dispensing amount of liquid crystal measured by the dispensing amount measuring unit 222 and a preset dispensing amount of liquid crystal set by the dispensing amount setting unit 210; a dispensing amount limitation value setting unit 226 for setting minimum/maximum limitation values of the differential value of the dispensing amount calculated by the differential value calculating unit 224 to prevent inferiority of the LCD device at the time of dispensing liquid crystal; and a comparing unit 228 for comparing the dispensing amount differential value inputted from the differential value calculating unit 224 and the dispensing amount limitation value inputted from the dispensing amount limitation value setting unit 226, thereby outputting a signal to the motor driving unit 230, and informing the user through the outputting unit 250.

The dispensing amount measuring unit 222 measures a dispensing amount of liquid crystal by using a gravimeter (scale, not shown). The scale measures the dispensing amount of liquid crystal and is installed to be integral or separate with/from the liquid crystal dispenser. That is, the dispensing amount of liquid crystal is measured by dispensing liquid crystal onto a certain number of liquid crystal panels or a certain number of substrate sheets and then dispensing the liquid crystal onto a measuring container provided at the scale with a certain number of times. The reason why the dispensing of a certain number of times is performed onto the measuring container is because a single dispensing amount of liquid crystal is very minute as several mg. Since it is impossible to precisely measure the minute amount, a dispensing of liquid crystal of a certain number of times (for example, 50 times or 100 times) is performed and a total weight is measured. Then, the total weight is divided by the number of dispensing times to calculate a single dispensing amount of liquid crystal.

Herein, a necessary value is a volume of a single dispensing amount not a weight of a single dispensing amount. The dispensing amount measuring unit 222 converts a weight of a calculated single dispensing amount into a volume based on a stored data regarding the weight and volume of liquid crystal being dispensed, and then outputs the value to the differential value calculating unit 224.

The dispensing amount limitation value setting unit 226 sets a limitation value for a differential value between a set value of liquid crystal and a substantially measured value. Herein, the dispensing amount limitation value setting unit 226 can set one limitation value or a plurality of limitation values. When setting one limitation value, the set dispensing amount limitation value means an allowable value of a dispensing amount of liquid crystal dispensed onto the liquid crystal panel. That is, if liquid crystal is dispensed with an error within the limitation value, inferiority of the LCD device is not generated. On the contrary, when setting a plurality of limitation values, each setting value defines different values. For example, when of setting two limitation values, a first limitation value defines an allowable value of the liquid crystal dispensing and a second limitation value defines a threshold value that causes inferiority of the liquid crystal dispensing.

That is, if the differential value between the measured dispensing amount and the preset dispensing amount of liquid crystal obtained by the comparing unit 228 is within the first limitation value, the inferiority of the LCD device is not generated by the liquid crystal dispensing and thereby the current liquid crystal dispensing is continuously performed. However, if the differential value exceeds the first limitation value and is within the second limitation value, the difference between the differential value (the difference value between the preset dispensing amount and the substantially measured dispensing amount, a dispensing amount compensating value) and the first limitation value is output to the motor driving unit 230 as a driving signal to compensate the dispensing amount of liquid crystal to be within the first limitation value. Also, when the differential value exceeds the second limitation value, the dispensing of liquid crystal is stopped and an alarm is transmitted to the user through the outputting unit 250.

The first limitation value and the second limitation value are determined by a size of the liquid crystal panel and a dispensing pattern of liquid crystal. In the present invention, the first limitation value is set as approximately 0.3% of the preset dispensing amount, and the second limitation value is set as approximately 0.5% of the preset dispensing amount.

Figure 16:
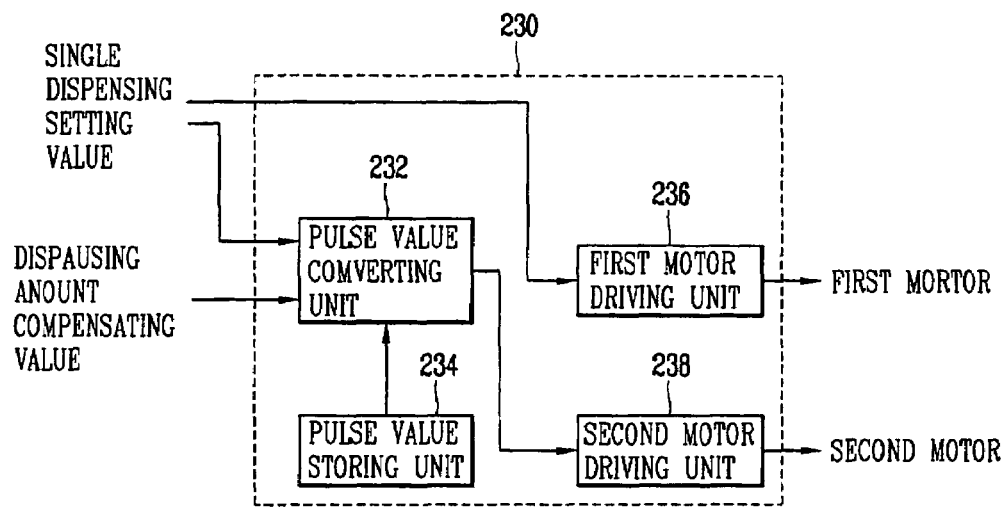
FIG. 16 is a block diagram of a motor driving unit.

In FIG. 16, the motor driving unit 230 includes: a pulse value storing unit 234 for storing pulse value information regarding a dispensing amount of liquid crystal in order to drive the first motor 131 and the second motor 133; a pulse value converting unit 232 for converting a single dispensing amount setting value input from the dispensing amount setting unit 210 and a dispensing amount compensating value input from the dispensing amount compensating unit 220 into a pulse value; a first motor driving unit 236 for outputting a driving signal accordingly as the single dispensing amount setting value is inputted and thereby driving the first motor 131 for operating the liquid crystal discharge pump 140; and a second motor driving unit 238 for outputting a driving signal for driving the second motor 133 accordingly as the pulse value converted by the pulse value converting unit 232 is inputted, and thereby varying a fixation angle of the liquid crystal discharge pump 140.

Much rotation angle information of the second motor 133 regarding a pulse value is stored in the pulse value storing unit 234. Therefore, as a pulse value is input, the second motor 133 is rotated as much as a corresponding angle and at the same time, the liquid crystal capacity amount controlling member 134 inserted into the rotational shaft 136 is linearly moved. Eventually, by the motion of the liquid crystal capacity amount controlling member 134, the fixation angle of the liquid crystal discharge pump 140 to a fixing unit 149 is varied and thereby the discharge amount of liquid crystal from the liquid crystal discharge pump 140 is varied. As aforementioned, the second motor 133 is a step motor and is rotated one time accordingly as approximately 1000 pulses are input. That is, the second motor 133 is rotated with approximately 0.36° for one pulse. Therefore, the rotation angle of the second motor 133 can be precisely controlled by a pulse, and the discharge amount of the liquid crystal discharge pump 140 can be precisely controlled.

Figure 17:
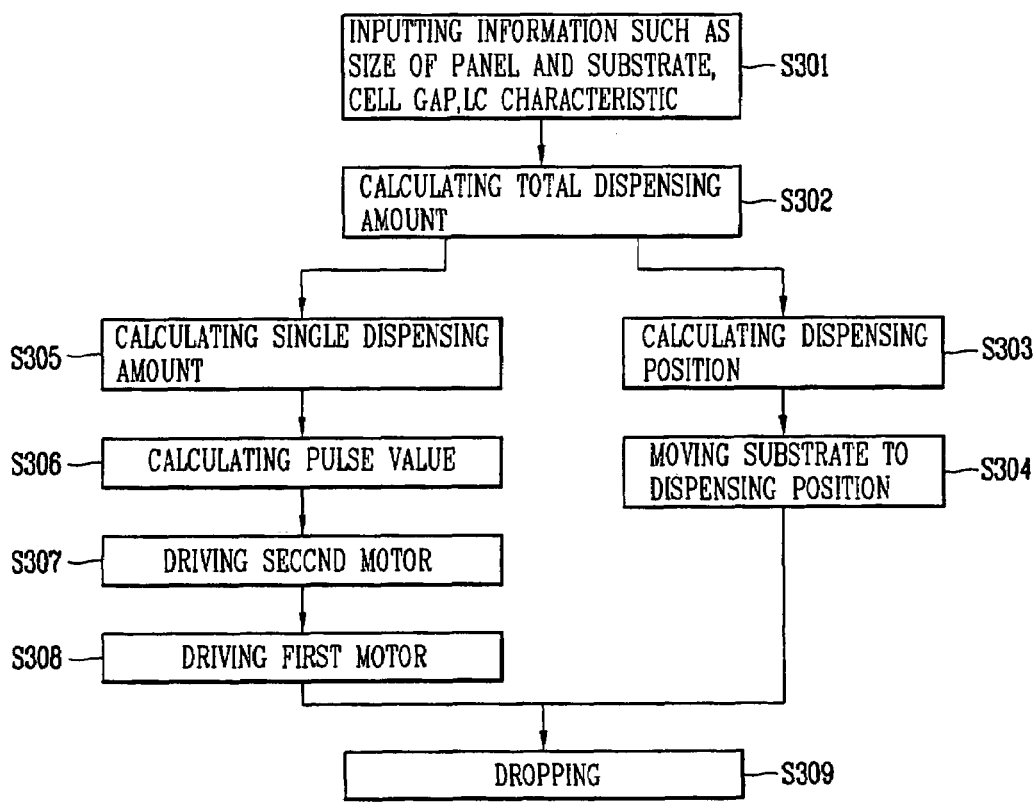
FIG. 17 is a flow chart of a liquid crystal dispensing method onto a substrate using the liquid crystal dispensing system.

The liquid crystal dispensing method using the liquid crystal dispenser will be explained in more detail with reference to the attached drawings. FIG. 17 is a flow chart of the liquid crystal dispensing method onto the substrate where a plurality of liquid crystal panels are formed using the liquid crystal dispenser. The method illustrated in FIG. 17 is for dispensing a preset amount of liquid crystal onto the substrate (or the liquid crystal panel) using the control unit 200.

First, the user inputs information such as a size of the liquid crystal panel, a cell gap, and a liquid crystal characteristic to the inputting unit 212 of the dispensing amount setting unit 210 by handling a key board, a mouse, and a touch panel (S301). According to this, the total dispensing amount calculating unit 214 of the dispensing amount setting unit 210 calculates a total dispensing amount of liquid crystal to be dispensed onto the substrate (or the panel) (S302). Then, the single dispensing amount calculating unit 216 and the dispensing position calculating unit 218 calculate a single dispensing amount and a dispensing position of liquid crystal to be dispensed onto the substrate based on the calculated total dispensing amount (S303, S305).

The substrate positioned at the lower position of the liquid crystal dispenser 120 moves in the x and y directions by a motor. The dispensing position calculating unit 218 calculates a dispensing position of liquid crystal based on the input total dispensing amount and the liquid crystal characteristic information and the substrate information, and operates the motor. According to this, the dispensing position calculating unit 218 moves the substrate so that the liquid crystal dispenser 120 can be positioned at the preset dispensing position (S304).

Under the state that the substrate is moved, the pulse value converting unit 232 of the motor driving unit 230 calculates a pulse value corresponding to the calculated single dispensing amount of liquid crystal (S306). Accordingly, as the calculated pulse value is input to the second motor driving unit 238, the second motor 133 is driven to adjust the fixation angle of the liquid crystal discharge pump 140 for correspondence with the preset discharge amount (S307). After adjusting the fixation angle of the liquid crystal discharge pump 140 as a preset angle (a preset dispensing amount or a preset discharge amount), the first motor driving unit 236 operates the first motor 131 to operate the liquid crystal discharge pump 140 and thereby starts to drop liquid crystal onto the substrate (S308, S309).

In the liquid crystal dispenser of the present invention, the liquid crystal discharge pump 140 is operated thus to dispense liquid crystal onto the substrate or the liquid crystal panel. Herein, the liquid crystal discharge pump 140 is operated by the first motor 131, and a servo motor is used as the first motor 131. The dispensing amount of liquid crystal dispensed onto the substrate, that is, the discharge amount of liquid crystal discharged from the liquid crystal discharge pump 140, is varied according to the fixation angle of the liquid crystal discharge pump 140 by the driving of the second motor 133 (i.e., according to the up-down motion range of the piston 145 of the liquid crystal discharge pump 140). Even if a servo motor can be used as the second motor 133, a step motor is preferably used. The reason is because the second motor 133 requires more precise motor driving than the first motor 131 and the step motor can be more precisely controlled than the servo motor. However, it is also possible to construct both the first motor 131 and the second motor 133 as the step motor.

Figure 18:
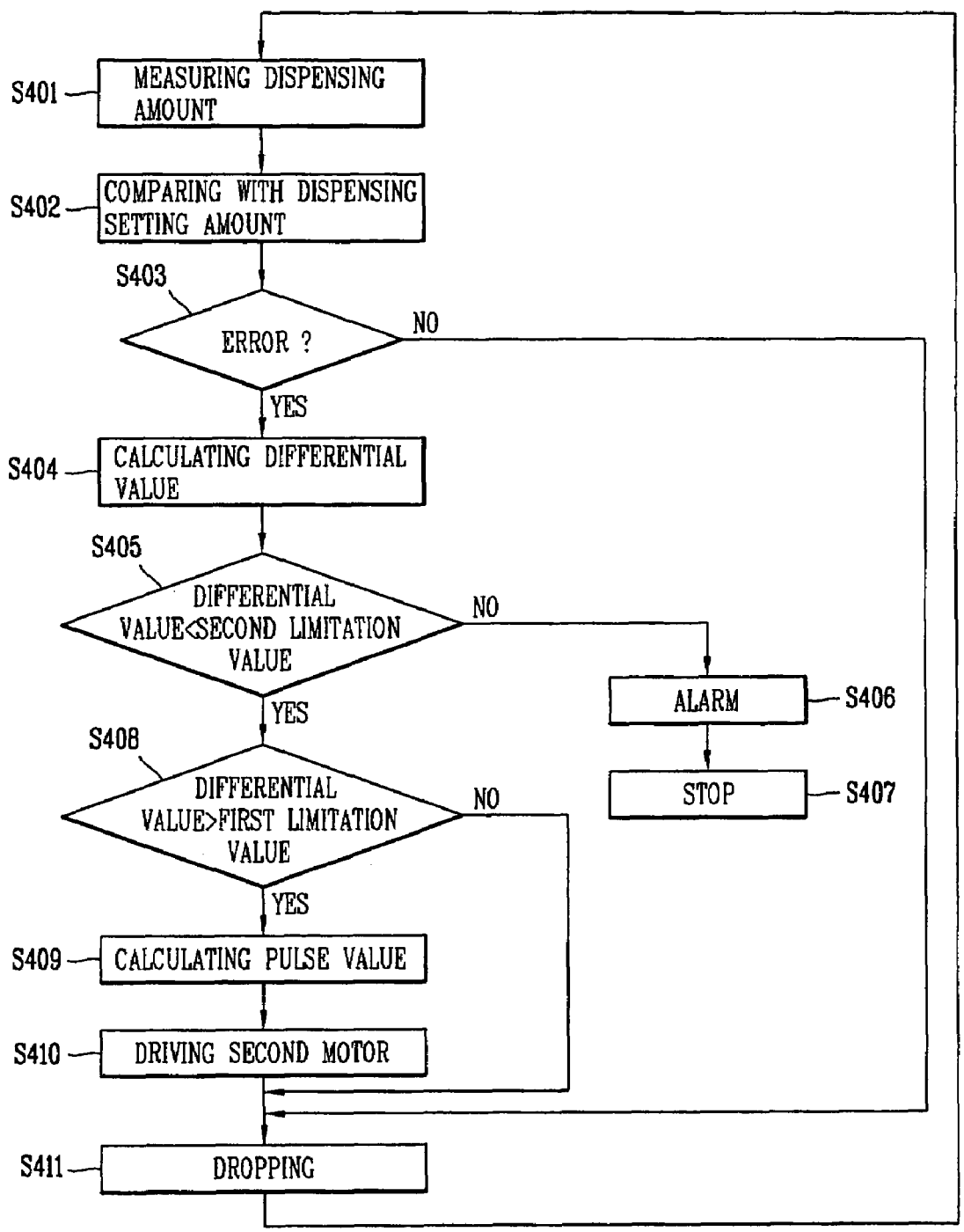
FIG. 18 is a flow chart of a dispensing amount error compensating method of liquid crystal in case that an error of a dispensing amount is generated.

A dispensing amount of liquid crystal dispensed onto the substrate is generally very minute (e.g. several mg). To precisely dispense the minute amount of liquid crystal is very difficult, and the amount is easily varied according to each kind of factor. Accordingly, it is necessary to dispense a precise amount of liquid crystal onto the substrate by compensating the dispensing amount of liquid crystal dispensed. The compensation of the dispensing amount of liquid crystal is performed by the dispensing amount compensating unit 220 of FIG. 13, which will be explained with reference to FIG. 18.

First, after dispensing liquid crystal with a preset number of times (for example, 50 times or 100 times, the dispensing of liquid crystal onto a preset number of sheets of the liquid crystal panel or the substrate), the dispensing amount of liquid crystal to be dispensed is measured by using a gravimeter (S401). Then, the measured dispensing amount is compared with a preset dispensing amount thus to determine whether an error of the dispensing amount exists or not (S402, S403). When an error does not exist, it is judged as that the current amount of liquid crystal being dispensed corresponds to the preset amount and thereby the dispensing is continuously performed. Also, when an error exists, the dispensing amount compensating unit 220 calculates a differential value between the preset dispensing amount and the measured dispensing amount (S404).

Then, the comparing unit 228 compares the calculated differential value of the dispensing amount of liquid crystal with the second limitation value input from the dispensing amount limitation value setting unit 226. Herein, the second limitation value is set as approximately 0.5% of the preset dispensing amount. If the differential value exceeds 0.5% of the preset dispensing amount of liquid crystal (S405), that is, the measured dispensing amount of liquid crystal exceeds 0.5% of the preset dispensing amount or lacks, the comparing unit 228 judges as that the current liquid crystal dispensing is abnormal. According to this, the comparing unit 228 rings an alarm to the user and applies a signal to the motor driving unit 230 thus to stop the driving of the first motor 131, thereby stopping the dispensing of liquid crystal (S406, S407).

The reason why the dispensing of liquid crystal is stopped is as follows. Since too great amount of liquid crystal or too small amount of liquid crystal was dispensed onto the substrate (or the liquid crystal panel), inferiority of the LCD device fabricated by the corresponding substrate (or the liquid crystal panel) may be generated. Therefore, the current dispensing of liquid crystal is stopped, the corresponding substrate is discarded, and then the differential value of the dispensing amount of liquid crystal is controlled to be within the range of the second limitation value.

When the differential value of the dispensing amount of liquid crystal is less than the second limitation value, the differential value is compared to the first limitation value (S408). Herein, the first limitation value is set as approximately 0.3% of the preset dispensing amount of liquid crystal. If the differential value of the dispensing amount of liquid crystal is less than the first limitation value, that is, the measured dispensing amount does not exceed 0.3% of the preset dispensing amount of liquid crystal or does not lack, the comparing unit 228 judges as that the current liquid crystal dispensing is normal, and the current liquid crystal dispensing is continuously performed (S411).

If the differential value between the substantially dispensed dispensing amount (the measured dispensing amount) and the preset dispensing amount is greater than the first limitation value, the motor driving unit 240 calculates a pulse value corresponding to the differential value (S409) and then outputs the calculated pulse value to the second motor 133 thus to drive the second motor 133 (S410). Accordingly, as the second motor 133 is driven, the rotational shaft 136 of FIG. 7 is rotated and the liquid crystal capacity amount controlling member 134 screw-coupled to the rotational shaft 136 is linearly moved. According to this, the fixation angle of the liquid crystal discharge pump 140 contacting the liquid crystal capacity amount controlling member 134 is varied, thereby dispensing the compensated amount of liquid crystal onto the substrate (discharging from the liquid crystal discharge pump) (S411).

The fixation angle of the liquid crystal discharge pump 140 varied by the liquid crystal capacity amount controlling member 134 is measured by the linear variable differential transformer 139 to be input to the motor driving unit 240. Then, the motor driving unit 240 judges that the liquid crystal discharge pump 140 was controlled as a desired angle by the fixation angle input from the linear variable differential transformer 139.

The compensating process of the dispensing amount of liquid crystal is repeatedly performed. That is, whenever the liquid crystal dispensing of a preset number of times is finished, the compensating process is repeated thus to dispense a precise amount of liquid crystal onto the substrate.

As aforementioned, in the liquid crystal dispenser of the present invention, the fixation angle of the liquid crystal discharge pump 140 fixed to the rotating member 157 of the liquid crystal dispenser is controlled to control the amount of liquid crystal drawn/discharged into/from the liquid crystal discharge pump 140, thereby precisely controlling the dispensing amount of liquid crystal.

A plurality of liquid crystal panels are formed on the substrate onto which liquid crystal is dispensed (for example, liquid crystal panels of 6 sheets, 12 sheets, or 15 sheets can be formed on one substrate). If liquid crystal is dispensed onto the substrate where a plurality of liquid crystal panels are formed using one liquid crystal dispenser, the dispensing time of liquid crystal onto one substrate is delayed, thereby reducing the fabrication efficiency of the LCD device.

Figure 19:
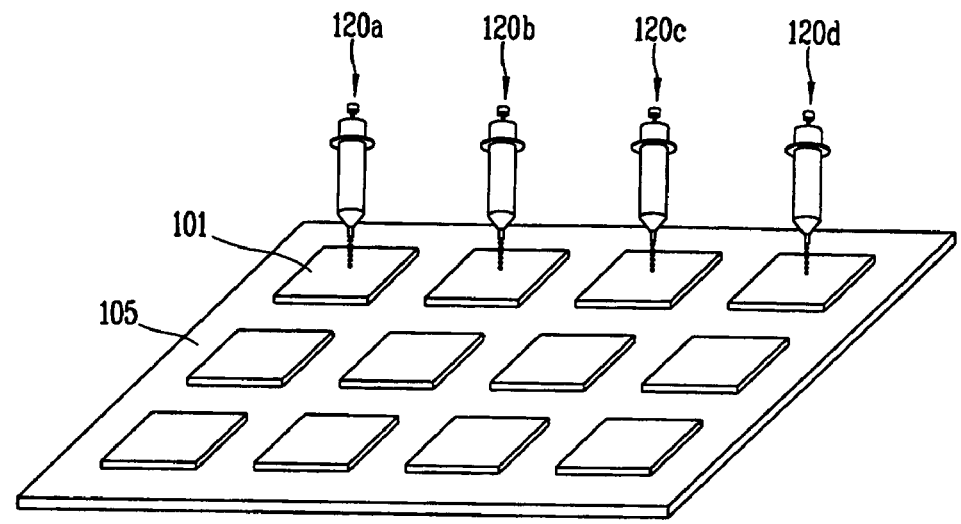
FIG. 19 is a view illustrating one example of dispensing liquid crystal by a plurality of liquid crystal dispensers onto a substrate where a plurality of liquid crystal panels are formed.
Figure 20:
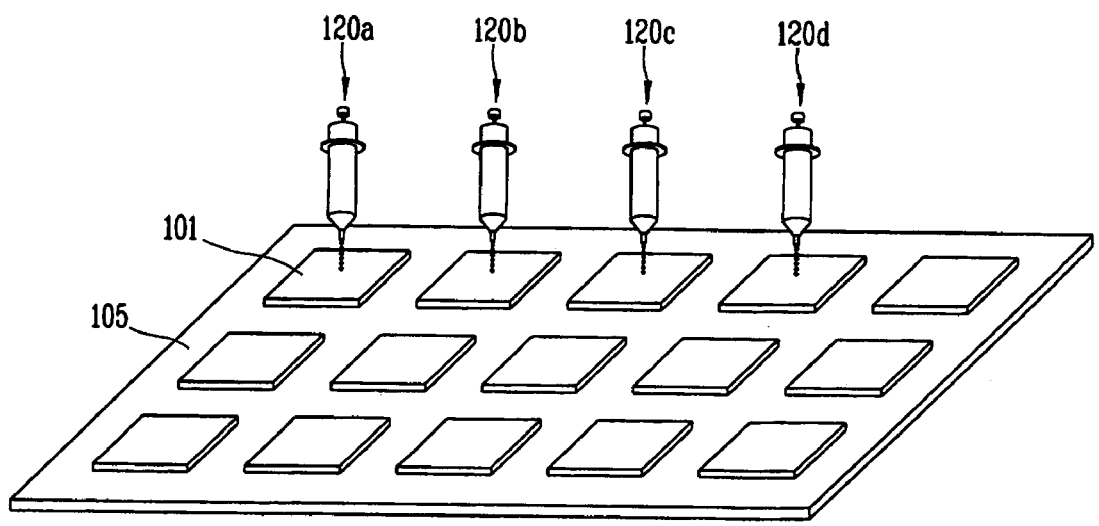
FIG. 20 is a view illustrating another example of dispensing liquid crystal by a plurality of liquid crystal dispensers onto a substrate where a plurality of liquid crystal panels are formed.

Therefore, it is preferable to use the plurality of liquid crystal dispensers 120 for the fast dispensing of liquid crystal. The number of the liquid crystal dispensers 120 can be arbitrarily controlled by the processing conditions, and the number is not limited. FIG. 19 is a view showing the dispensing of liquid crystal onto the substrate 105 where 12 liquid crystal panels 101 are formed using 4 liquid crystal dispensers (120a-120d), and FIG. 20 is a view showing the dispensing of liquid crystal onto the substrate 105 where 15 liquid crystal panels 101 are formed using 4 liquid crystal dispensers (120a-120d). As shown, the number of liquid crystal dispensers 120a-120d can be same as the number of liquid crystal panels arranged in series or different from that.

Each liquid crystal dispensers 120a-120d can be separately controlled. That is, the dispensing amount setting unit 210 sets the dispensing amount of liquid crystal for each liquid crystal dispenser 120a-120d, and applies a pulse value corresponding to the set dispensing amount to the second motor installed at each liquid crystal dispensers 120a-120d. According to this, each liquid crystal dispenser 120a-120d dispenses liquid crystal onto the corresponding liquid crystal panel. When compensating the dispensing amount of liquid crystal, the current dispensing amount of liquid crystal is measured for each liquid crystal dispenser 120a-120a and then is compared with the preset dispensing amount, thereby calculating the differential value and compensating the dispensing amount. As aforementioned, the plurality of liquid crystal dispensers 120a-120d are independently controlled to precisely control the dispensing amount of liquid crystal dispensed onto the plurality of liquid crystal panels formed on the substrate.

In the present invention, the fixation angle of the liquid crystal discharge pump is controlled by the step motor that can be precisely controlled, thereby controlling the dispensing amount of liquid crystal dispensed onto the substrate and thereby dispensing a precise amount of liquid crystal onto the substrate at all times. Also, when compensating the dispensing amount of liquid crystal in the present invention, the preset dispensing amount and the measured dispensing amount are compared to the first and second limitation values. Herein, if the current dispensing amount of liquid crystal is scarcely different from the preset dispensing amount of liquid crystal, the liquid crystal compensating is omitted. Also, if the current dispensing amount of liquid crystal is excessively different from the preset dispensing amount of liquid crystal, the liquid crystal dispensing is stopped. According to this, faster control of the dispensing amount of liquid crystal is possible.

It will be apparent to those skilled in the art that various modifications and variations can be made in the liquid crystal dispensing system and method of dispensing liquid crystal material using the same of the present invention without departing from the spirit or scope of the invention. Thus, it is intended that the present invention cover the modifications and Variations of this invention provided they come within the scope of the appended claims and their equivalents.

What is claimed is:

1. A method of manufacturing a liquid crystal display device comprising:
   providing first and second substrates;
   dispensing liquid crystal onto one of the first and second substrates using a liquid crystal dispensing system, the liquid crystal dispensing system including a container to contain liquid crystal to be dispensed;
   a discharge pump to receive the liquid crystal from the container and to discharge the liquid crystal;
   a nozzle to dispense the liquid crystal discharged from the discharge pump onto a substrate; and
   a control unit to control a dispensing amount of liquid crystal discharged from the discharge pump, the control unit compensating the dispensing amount when the dispensing amount of liquid crystal exceeds a first limitation value and the control unit stopping the dispensing the liquid crystal when the dispensing amount of liquid crystal exceeds a second limitation value; and
   joining together the first and second substrates.

2. The method of claim 1, wherein the discharge pump includes:
   a cylinder;
   a piston inserted into the cylinder and provided with a groove at a lower portion thereof to draw in and to discharge liquid crystal in accordance with rotational and up/down motion of the piston;
   a suction opening through which the liquid crystal is drawn in; and
   a discharge opening through which the liquid crystal is discharged.

3. The method of claim 1, wherein the liquid crystal dispensing system further include a liquid crystal capacity amount controlling member to control the discharge amount of liquid crystal by varying the fixation angle of the discharge pump.

4. The method of claim 1, wherein the liquid crystal dispensing system further include a first detecting unit installed near the second connecting tube to detect whether vapor is included in the liquid crystal discharged from the discharge pump.

5. The method of claim 4, wherein the liquid crystal dispensing system further include a second detecting unit installed near the nozzle to detect whether liquid crystal has collected on the surface of the nozzle.

6. The method of claim 1, wherein the control unit includes:
   a dispensing amount setting unit to set a dispensing amount of liquid crystal to be dropped onto the substrate;
   a dispensing amount compensating unit to compensate a differential value between the dispensing amount of liquid crystal set by the dispensing amount setting unit and a substantial dispensing amount onto the substrate;
   a motor driving unit to operate the discharge pump by driving a motor; and
   a substrate driving unit to drive the substrate so that the dispensing position of a substrate where the liquid crystal is to be dispensed is aligned with the nozzle.

7. The method of claim 6, wherein the dispensing amount setting unit includes:
   an input unit to input data;
   a total dispensing amount calculating unit to calculate a total dispensing amount of liquid crystal to be dispensed onto the substrate based on the data input into the input unit;
   a single dispensing amount calculating unit to calculate a single dispensing amount of liquid crystal based on the calculated total dispensing amount of liquid crystal; and
   a dispensing position calculating unit to calculate a dispensing position of liquid crystal based on the calculated total dispensing amount of liquid crystal.

8. The method of claim 6, wherein the dispensing amount compensating unit includes:
   a dispensing amount measuring unit to measure a dispensing amount of liquid crystal dispensed onto the substrate;
   a differential value calculating unit to calculate a differential value between a dispensing amount of liquid crystal measured by the dispensing amount measuring unit and a preset dispensing amount of liquid crystal;
   a dispensing amount limitation value setting unit to set a limitation value of the differential value of the dispensing amount; and
   a comparing unit to compare the dispensing amount differential value and the dispensing amount limitation value respectively input from the differential value calculating unit and the dispensing amount limitation value setting unit and to output a signal to the motor driving unit.

9. The method of claim 8, wherein when the dispensing amount of liquid crystal exceeds the first limitation value, a signal is output to the motor to compensate the dispensing amount.

10. The method of claim 8, wherein when the dispensing amount of liquid crystal exceeds second first limitation value, a signal is output to the motor to stop the liquid crystal dispensing.

11. The method of claim 1, wherein the second limitation value is greater than the first limitation value.

12. The method of claim 11, wherein the first limitation value corresponds to 0.3% of a preset dispensing amount of liquid crystal.

13. The method of claim 11, wherein the second limitation value corresponds to 0.5% of a preset dispensing amount of liquid crystal.

14. The method of claim 8, wherein the dispensing amount measuring unit includes a gravimeter.

15. The method of claim 6, wherein the motor driving unit includes:
- a pulse value storing unit to store pulse value information regarding a dispensing amount of liquid crystal; and
- a pulse value converting unit to convert a single dispensing amount setting value input from the dispensing amount setting unit and a dispensing amount compensating value input from the dispensing amount compensating unit into a pulse value based on the pulse value information stored in the pulse value storing unit.

16. A method of manufacturing a liquid crystal display device comprising:
- providing first and second substrates;
- dispensing liquid crystal onto one of the first and second substrates using liquid crystal dispensing system, the liquid crystal dispensing system including
- a plurality of dispensers to dispense liquid crystal onto a substrate defining a plurality of unit panels; and
- a control unit to control a dispensing amount of liquid crystal dispensed from the liquid crystal dispenser, the control unit compensating the dispensing amount when the dispensing amount of liquid crystal exceeds a first limitation value and the control unit stopping the dispensing the liquid crystal when the dispensing amount of liquid crystal exceeds a second limitation value; and
- joining together the first and second substrates.

17. The method of claim 16, wherein the liquid crystal dispenser includes:
- a container to contain liquid crystal;
- a discharge pump having a case with a liquid crystal injection hole and a liquid crystal discharge opening, a cylinder, a piston inserted into the cylinder and provided with a groove at a lower portion thereof to draw in and discharge liquid crystal by rotating and moving up and down, a suction opening through which liquid crystal is drawn in as the piston moves, and a discharge opening through which liquid crystal discharged as the piston moves;
- a first motor to drive the discharge pump; and
- a nozzle disposed at a lower portion of the discharge pump to dispense liquid crystal discharged from the discharge pump.

18. The method of claim 17, wherein the control unit includes:
- a control member contacting the discharge pump to adjust a fixation angle of the discharge pump;
- a second motor connected to the control member by a rotational shaft to control the control member; and
- a dispensing amount setting unit to set a dispensing amount of liquid crystal and to output a signal corresponding to the preset dispensing amount to the second motor.

19. The method of claim 17, wherein the control unit includes:
- a controlling member contacting the discharge pump to adjust a fixation angle of the discharge pump;
- a second motor connected to the controlling member by the rotational shaft to control the controlling member; and
- a dispensing amount compensating unit to compensate a dispensing amount of liquid crystal by comparing a measured dispensing amount with a predetermined dispensing amount.

20. The method of claim 17, wherein the control unit includes:
- a controlling member contacting the discharge pump to adjust a fixation angle of the discharge pump;
- a second motor connected to the controlling member by the rotational shaft to control the controlling member;
- a dispensing amount setting unit to set a dispensing amount of liquid crystal and to output a signal corresponding to the preset dispensing amount to the second motor; and
- a dispensing amount compensating unit to compensate a dispensing amount of liquid crystal by comparing a measured dispensing amount with a dispensing amount set by the dispensing amount setting unit.

21. The method of claim 20, wherein the dispensing amount compensating means includes:
- a dispensing amount measuring unit to measure a dispensing amount of liquid crystal dispensed onto a substrate;
- a differential value calculating unit to calculate a differential value between a dispensing amount of liquid crystal measured by the dispensing amount measuring unit and a preset dispensing amount of liquid crystal;
- a dispensing amount limitation value setting unit to set a limitation value of the differential value of the dispensing amount; and
- a comparing unit to compare the dispensing amount differential value and the dispensing amount limitation value respectively input from the differential value calculating unit and the dispensing amount limitation value setting unit and to output a signal to the motor driving unit.

22. The method of claim 21, wherein when the dispensing amount of liquid crystal exceeds the first limitation value, a signal is output to the second motor to compensate the dispensing amount.

23. The method of claim 21, wherein when the dispensing amount of liquid crystal exceeds the second limitation value, a signal is output to the motor to stop dispensing the liquid crystal.

24. The method of claim 16, wherein the second limitation value is greater than the first limitation value.

25. The method of claim 24, wherein the first limitation value corresponds to 0.3% of a preset dispensing amount of liquid crystal.

26. The method of claim 24, wherein the second limitation value corresponds to 0.5% of a preset dispensing amount of liquid crystal.

* * * * *

UNITED STATES PATENT AND TRADEMARK OFFICE
CERTIFICATE OF CORRECTION

| | | |
|---|---|---|
| PATENT NO. | : 7,322,490 B2 | Page 1 of 1 |
| APPLICATION NO. | : 10/840415 | |
| DATED | : January 29, 2008 | |
| INVENTOR(S) | : Joung-Ho Ryu et al. | |

It is certified that error appears in the above-identified patent and that said Letters Patent is hereby corrected as shown below:

Please correct item no. 73 on the Title Page. The assignees should be:

LG Display Co., Ltd.
Top Engineering, Co., Ltd.

Signed and Sealed this
Twenty-ninth Day of May, 2012

David J. Kappos
*Director of the United States Patent and Trademark Office*